US012650386B2

(12) United States Patent
Furusato et al.

(10) Patent No.: US 12,650,386 B2
(45) Date of Patent: Jun. 9, 2026

(54) TEST STRIP HOLDER AND TEST STRIP DISCHARGING MECHANISM

(71) Applicant: ARKRAY, Inc., Kyoto (JP)

(72) Inventors: Noriaki Furusato, Kyoto (JP); Yusuke Wada, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 634 days.

(21) Appl. No.: 18/053,702

(22) Filed: Nov. 8, 2022

(65) Prior Publication Data

US 2023/0152237 A1      May 18, 2023

(30) Foreign Application Priority Data

Nov. 12, 2021      (JP) ................................. 2021-185192

(51) Int. Cl.
G01N 21/78        (2006.01)
B01L 3/00        (2006.01)
        (Continued)

(52) U.S. Cl.
CPC ............ G01N 21/78 (2013.01); B01L 3/5023 (2013.01); B01L 9/52 (2013.01);
        (Continued)

(58) Field of Classification Search
None
See application file for complete search history.

(56) References Cited

U.S. PATENT DOCUMENTS 5,470,533 A * 11/1995 Shindo ............. G01N 35/00029
                                                                422/68.1
5,556,597 A      9/1996 Shindo et al.
(Continued)

FOREIGN PATENT DOCUMENTS

EP        0597419 A1     5/1994
EP        0620440 A2    10/1994
        (Continued)

OTHER PUBLICATIONS

An Office Action; "Notice of Reasons for Refusal," mailed by the Japanese Patent Office on Dec. 17, 2024, which corresponds to Japanese Patent Application No. 2021-185192 and is related to U.S. Appl. No. 18/053,702; with English language translation.
The extended European search report issued by the European Patent Office on Mar. 21, 2023, which corresponds to European U.S. Appl. No. 18/053,702-1001 and is related to U.S. Appl. No. 18/053,702.

*Primary Examiner* — Neil N Turk
*Assistant Examiner* — Benjamin Joseph Kass
(74) *Attorney, Agent, or Firm* — Studebaker Brackett PLLC

(57)        ABSTRACT

A test strip holder includes: a holding member at which at least a portion of a lower side of an inner periphery is a cylindrical surface having a cylindrical shape, and at whose interior a test strip is held, and at which a direction of an imaginary central axis of the cylindrical surface is a horizontal direction or a direction inclined with respect to a vertical direction; an opening portion provided in an outer surface of the holding member; a sorting member rotating at an interior of the holding member around a rotation axis that coincides with the central axis; a pushing piece projecting out from a distal end edge, which is parallel to the central axis, at the sorting member in a direction of rotation of the sorting member; and a sorting piece projecting out from a distal end of the pushing piece toward the cylindrical surface.

19 Claims, 32 Drawing Sheets

(51) Int. Cl.
    B01L 9/00           (2006.01)
    B65G 47/14        (2006.01)
    G01N 21/77        (2006.01)

(52) U.S. Cl.
    CPC . *B01L 2300/0609* (2013.01); *B01L 2300/069*
        (2013.01); *B01L 2300/0825* (2013.01); *B01L*
        *2300/0841* (2013.01); *B65G 47/14* (2013.01);
        *B65G 47/1428* (2013.01); *G01N 2021/7759*
        (2013.01); *G01N 2201/021* (2013.01)

(56) References Cited

U.S. PATENT DOCUMENTS

2010/0127014 A1*  5/2010  Chan ................ G01N 33/48757
                                   204/403.02
2013/0020347 A1*  1/2013  Gieda ................ G01N 33/4875
                                   221/255

FOREIGN PATENT DOCUMENTS

| | | |
|---|---|---|
| JP | H05-264540 A | 10/1993 |
| JP | H06-148201 A | 5/1994 |
| JP | 2000-035433 A | 2/2000 |

* cited by examiner

TEST STRIP HOLDER AND TEST STRIP DISCHARGING MECHANISM

CROSS-REFERENCE TO RELATED APPLICATION

This application claims priority under 35 USC 119 from Japanese Patent Application No. 2021-185192, filed on Nov. 12, 2021, the disclosure of which is incorporated by reference herein.

BACKGROUND

Technical Field

The present invention relates to a test strip holder and a test strip discharging mechanism.

Related Art

In order to carry out measurement continuously by using test strips that are used to measure a predetermined item included in a sample of urine or the like, a mechanism is used that inserts plural test strips into a device, and takes the inserted test strips out one-by-one. A specimen is applied to the test strip that is taken out by the mechanism, and the predetermined item is measured.

For example, in the technique disclosed in Japanese Patent Application Laid-Open (JP-A) No. H05-264540, an "in-drum claw portion" is provided at a drum container. While the drum container is rotatingly driven, testing papers that are stored therein catch on this "in-drum claw portion" one-by-one, and are dropped onto a sorter rack. Further, in the test strip feeding mechanism disclosed in JP-A No. 2000-35433, when plural test strips that have been inserted in an insertion section move to a test strip detection block, only one test strip is flattened by a partitioning plate. Thereby, test strips are taken out one-by-one from the insertion section, and are supplied to the testing section that is next.

In the technique of JP-A No. H05-264540, there are cases in which, if plural test strips enter into the "in-drum claw portion", plural test strips are discharged. Further, in the technique of JP-A No. 2000-35433, at the time of flattening stacked test strips by the partitioning plate, the test strip that is stacked on top is pushed aside as if swept off. At this time, there are cases in which shavings due to contact between the partitioning plate and the test strip are formed.

SUMMARY

The present disclosure provides a test strip holder that can reliably take test strips out one-by-one, and at which damage that arises at the test strips accompanying this removal is reduced.

A test strip holder of an aspect of the present disclosure has a holding member, an opening portion, a sorting member, a pushing piece, and a sorting piece. At least a portion of the lower side of the inner periphery of the holding member is a cylindrical surface. A test strip that is elongated and has thickness X is held at the interior of the holding member. The direction of the imaginary central axis of the cylindrical surface is a horizontal direction or a direction inclined with respect to the vertical direction. The opening portion is provided in the outer surface of the holding member. The sorting member rotates at the interior of the holding member around a rotation axis that coincides with the central axis. The pushing piece projects out from a distal end edge, which is parallel to the central axis, at the sorting member in the direction of rotation of the sorting member. The sorting piece projects out from the distal end of the pushing piece toward the cylindrical surface. The distance between the cylindrical surface and the position, which is closest to the cylindrical surface, at the distal end edge is less than X. Distance A between the cylindrical surface and the position, which is closest to the cylindrical surface, at the sorting piece satisfies $X \leq A < 2X$.

Because exemplary embodiments of the present disclosure are structured as described above, there is provided a test strip holder that can reliably take test strips out one-by-one, and at which damage that arises at the test strips accompanying this removal is reduced.

BRIEF DESCRIPTION OF THE DRAWINGS

Exemplary embodiments will be described in detail based on the following figures, wherein.

DETAILED DESCRIPTION

Figure 1:
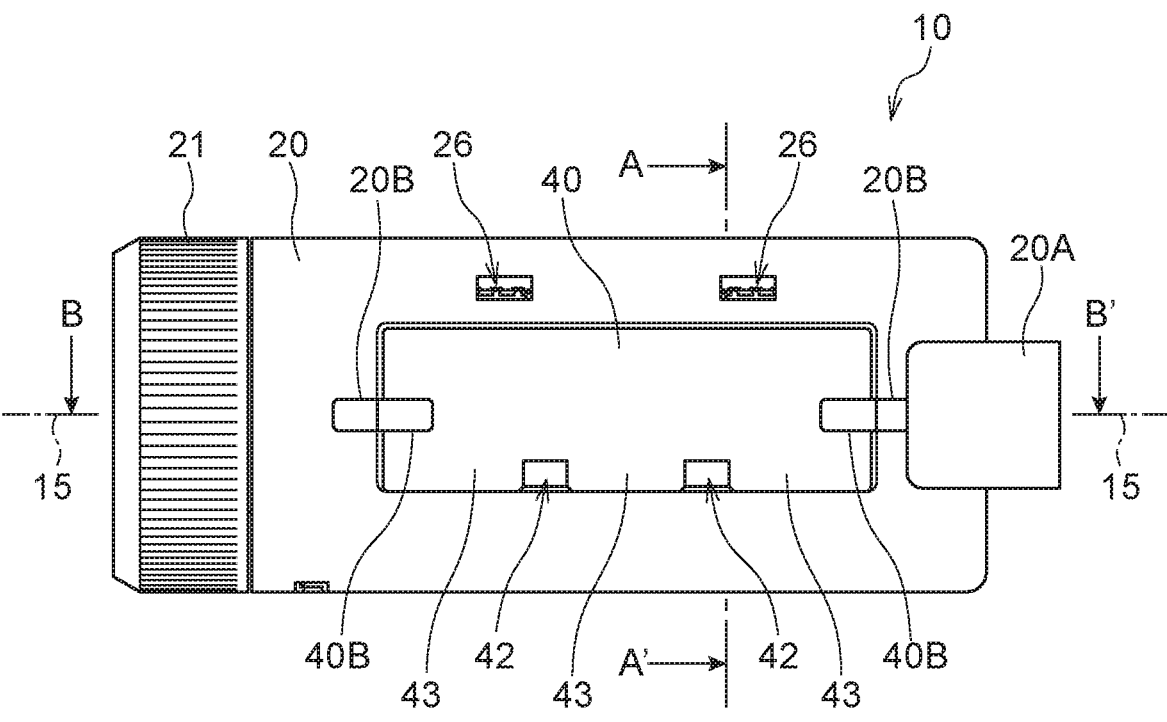
FIG. 1 illustrates a test strip holder of a first exemplary embodiment in a front view.

Exemplary embodiments of the present disclosure are described hereinafter with reference to the drawings. Note that reference numerals that are used in common in the respective drawings indicate the same objects even if not stated in the following descriptions of the respective drawings.

(1) First Exemplary Embodiment

Figure 2:
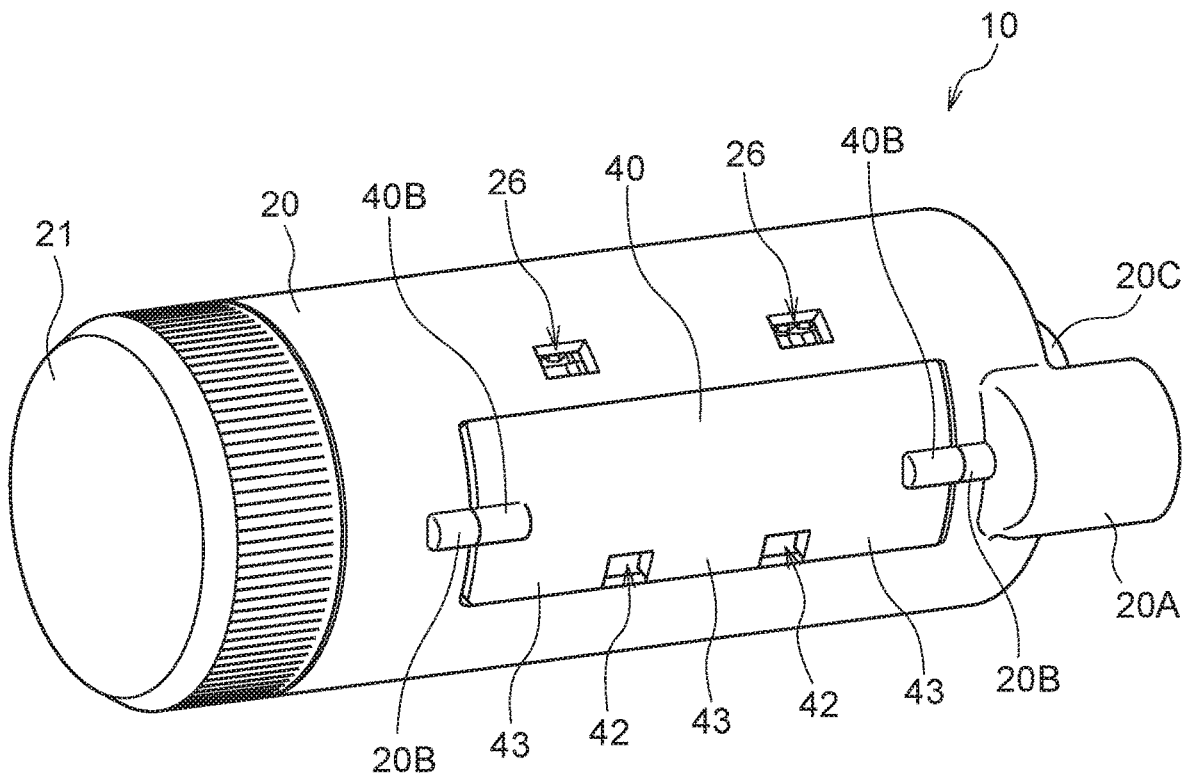
FIG. 2 illustrates the test strip holder of FIG. 1 in a front perspective view.
Figure 3:
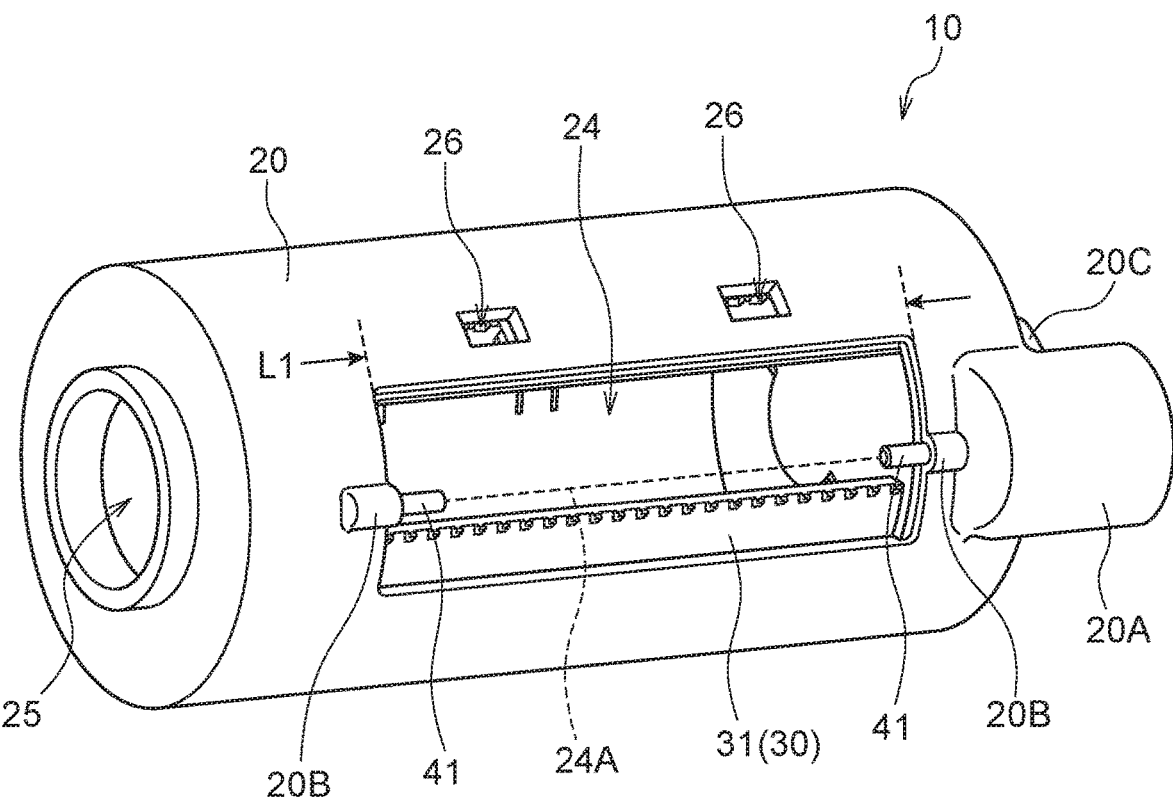
FIG. 3 illustrates, in a front perspective view, a state in which a cap and a door member have been removed from the test strip holder of FIG. 2.
Figure 4:
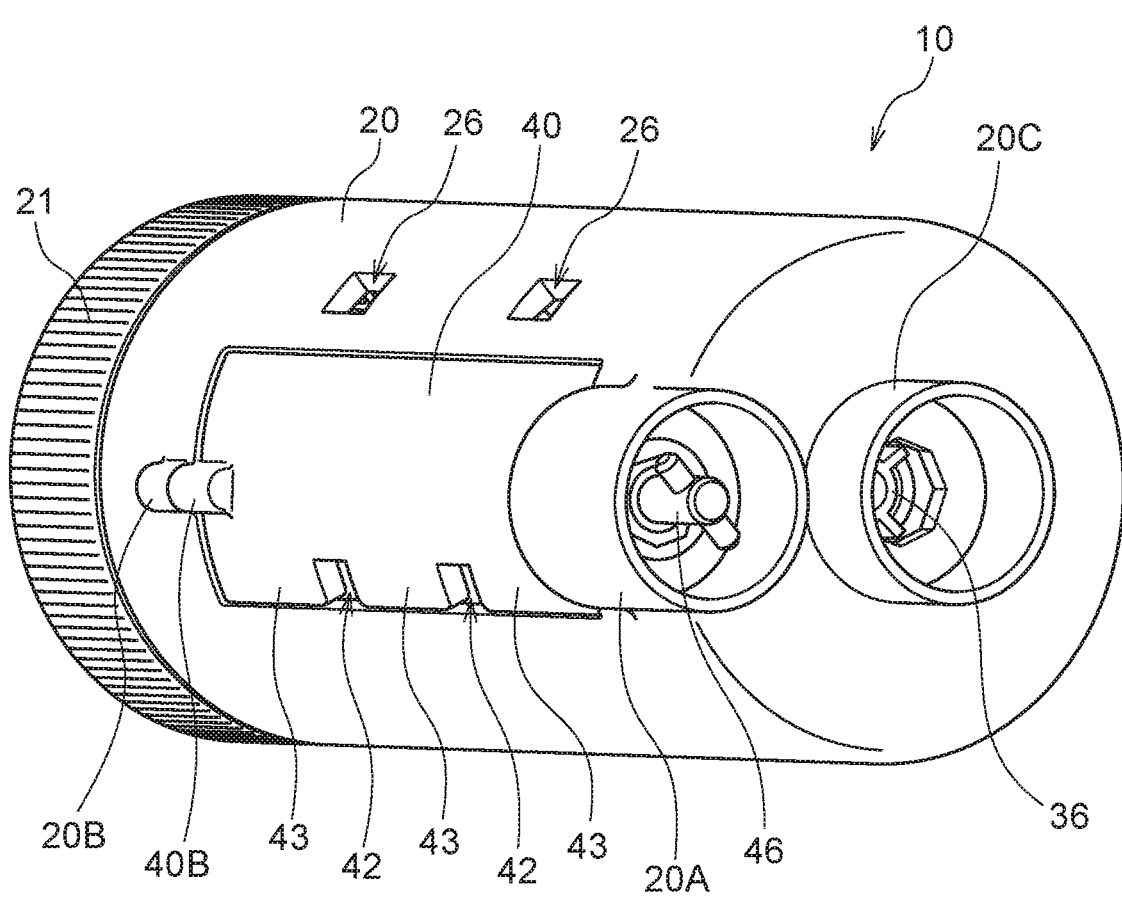
FIG. 4 illustrates the test strip holder of FIG. 1 in a rear perspective view.

FIG. 1 illustrates a test strip holder 10 of a first exemplary embodiment in a front view. FIG. 2 illustrates the test strip holder 10 in a front perspective view. FIG. 3 illustrates, in a front perspective view, a state in which a cap 21 and a door member 40 have been removed from the test strip holder 10. FIG. 4 illustrates the test strip holder 10 in a rear perspective view. Note that, in the following description, a direction in which a cap 21 (FIG. 1, FIG. 2, FIG. 4) is provided at the test strip holder 10 is called a front side, and a direction in which a connecting portion 20C is provided at the test strip holder 10 is called a rear side.

The test strip holder 10 of the present exemplary embodiment has a holding member 20 whose side surface is cylindrical. As illustrated in FIG. 1, FIG. 2 and FIG. 4, a cap 21 that is shaped as a short cylinder is attached to one end side of the holding member 20. A door member 40, which is substantially rectangular as seen in a front view (FIG. 1), is provided at a side surface of the holding member 20. A pair of bearings 40B that project out toward an outer side in a cylindrical shape are provided at both ends of the door member 40. The pair of bearings 40B are respectively connected to bearings 20B that are shaped as cylinders of the same diameter and bulge out from the side surface of the holding member 20. A pair of door shafts 41 (FIG. 3) are accommodated in these bearings 40B, 20B. The door member 40 is pivotally supported at the pair of door shafts 41, and can rotate as described later.

On the other hand, a driving shaft accommodating portion 20A, which is cylindrical and bulges out toward the outer side, is provided at another end side of the holding member 20. As illustrated in FIG. 4, a door driving shaft 46 is accommodated in this driving shaft accommodating portion 20A. The door driving shaft 46 and the door shafts 41 have the same axial centers. The door driving shaft 46 is held at an opening/closing operation device 4 (see FIG. 11) that is described later, and the door member 40 is opened and closed due to the door driving shaft 46 rotating around the axial center. Moreover, the connecting portion 20C that is shaped as a cylinder of a slightly smaller diameter projects out at the another end side of the holding member 20. This connecting portion 20C is connected to a rotation driving device 3 (see FIG. 11) when the test strip holder 10 is attached to a test strip discharging mechanism 1 that is described later. A rotation driving shaft 36 of a rotating member 30 (FIG. 7, FIG. 8) that is described later is visible from an opening provided at the center of the connecting portion 20C.

Figure 5:
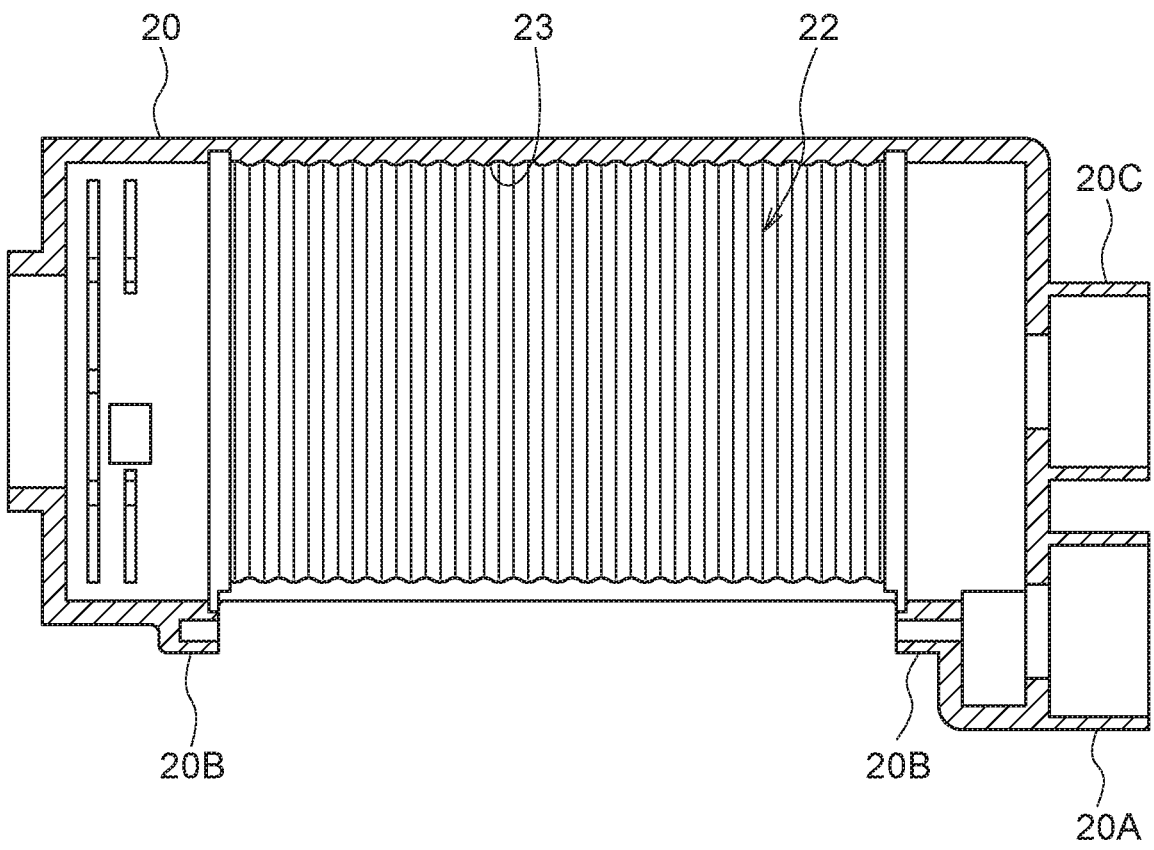
FIG. 5 illustrates, in a cross-section along line B-B' of FIG. 1, a cylindrical surface that is the inner periphery of a holding member at the test strip holder of FIG. 1.

As illustrated in FIG. 5 that shows the cross-section along line B-B' of FIG. 1, at least a portion of (in the present exemplary embodiment, all of) the lower side of the inner periphery of the holding member 20 is a cylindrical surface 22 that has a cylindrical shape. The central axis of the cylindrical surface 22 is an imaginary central axis 15 (FIG. 1) of the holding member 20. Moreover, plural inner peripheral grooves 23 are formed in the cylindrical surface 22 along the peripheral direction. Note that, at the holding member 20, there are cases in which the upper half may be an opening portion 24, provided that at least a portion of the lower side (e.g., half) is the cylindrical surface 22.

Figure 6A:
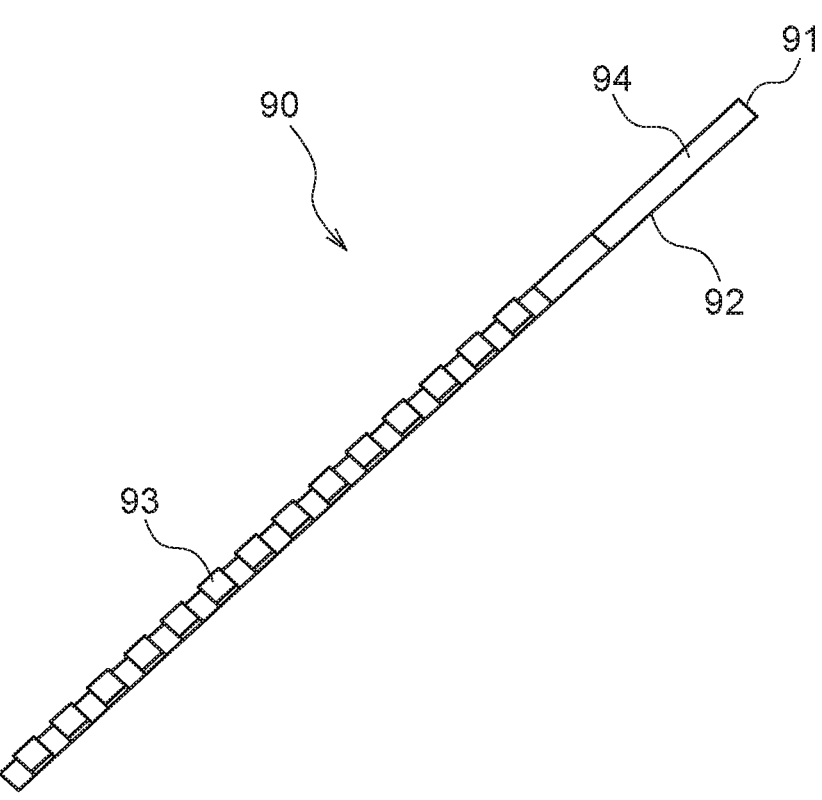
FIG. 6A illustrates a test strip in a perspective view.
Figure 6B:
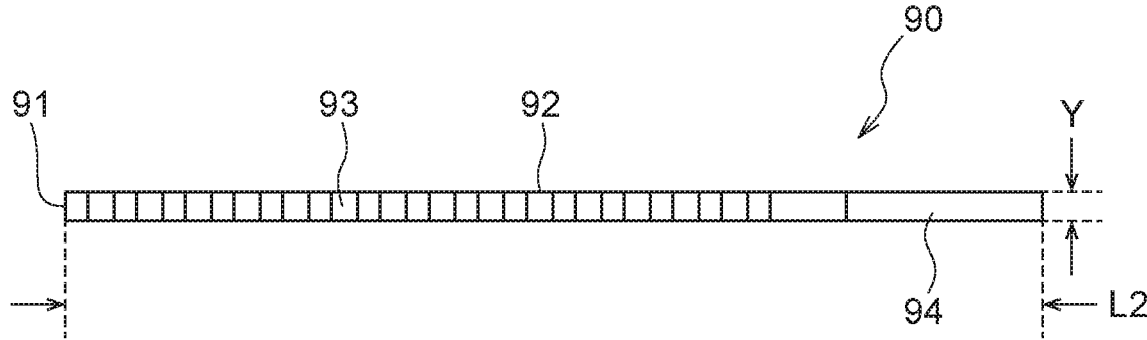
FIG. 6B illustrates the test strip in a front view.
Figure 6C:
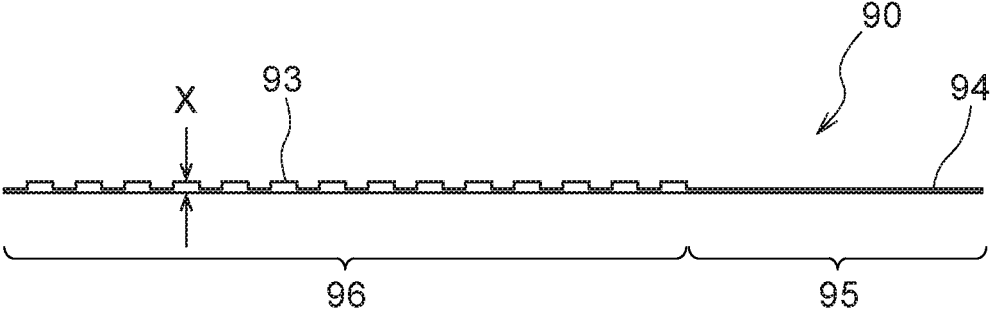
FIG. 6C illustrates the test strip in a side view.

A test strip 90 that is elongated and illustrated in FIG. 6A to FIG. 6C is held at the interior of the holding member 20 of the test strip holder 10. In the present exemplary embodiment, a urine test strip for measuring a concentration of or the absence or presence of a physical characteristic or a specific component within urine, is given as an example of the test strip 90.

As illustrated, the test strip 90 is a structure in which plural reagent pads 93 are disposed on a strip-shaped substrate 94. A grasping portion 95 that is grasped within an unillustrated measuring device is provided at one end of the substrate 94, and the other region of the substrate 94 is a reagent pad placement region 96 (see FIG. 6C). The plural reagent pads 93 are disposed at the reagent pad placement region 96 in series along the longitudinal direction with a fixed interval therebetween.

The material of the substrate 94 is not particularly limited, and examples thereof are resin, metal, glass and the like. The color of the substrate is not particularly limited, and may be any of white, grey, black, a chromatic color, or transparent. The size of the substrate 94 is not particularly limited, and is determined appropriately in accordance with items to be tested, standards of an analyzing device that is used, and the like, and can be, for example, a length of 50~150 mm, a width of 2~10 mm, and a thickness of 0.1~1.0 mm. In the present exemplary embodiment, the length in a long-length direction of the test strip 90, i.e., the length of long side 92, is L2 (FIG. 6B), and the length in a short-length direction, i.e., the length of short side 91, is Y (FIG. 6B). Accordingly, the length of the holding member 20 in the longitudinal direction is greater than or equal to the length of the test strip. In this way, the size of the test strip 90 that is suitable for the test strip holder 10 of the present exemplary embodiment is limited.

Examples of the material of the reagent pad 93 are filter paper, glass-fiber filter paper, knit fabric, woven fabric, non-woven fabric, a membrane filter, a porous resin sheet, a plastic film, and the like. Further, the shape of the reagent pad 93 is not particularly limited, and is square, rectangular, circular, oval or the like. The size of the reagent pad 93 is not particularly limited, and, when the shape thereof is rectangular, for example, the size can be made to be a length and width of 2~10 mm and a thickness of 0.05~1.0 mm. In the present exemplary embodiment, the thickness of the thick-walled portion is X (FIG. 6C). At the time of forming the reagent pad 93, the reagent pad may be molded into a predetermined shape after the reagent is suffused into the above-described pad material, or the reagent may be suffused after the pad material is molded into a predetermined shape. The suffusing of the reagent can be carried out by, for example, immersing the pad material in a reagent solution and drying the pad material. Further, for example, an adhesive or a tackifier can be used in disposing the reagent pads 93 at the substrate 94. For example, polyurethane, acrylic, vinyl chloride, epoxy, nylon, hot melt, cyanoacrylate, rubber or the like can be used as the adhesives and tackifiers.

Note that the thickness X of the test strip 90 is a distance of the thickest portion of the test strip used in the test strip holder 10, and, at the above-described test strip 90, is the thickness of the reagent pad 93. If the test strip 90 has a portion that is thicker than the reagent pad 93, the thickness of that place is X.

At the test strip discharging mechanism 1 that is described later, the test strip holder 10 is attached such that the direction of the imaginary central axis 15 (FIG. 1) of the holding member 20 is the horizontal direction. However, the direction of this central axis 15 is not limited to the horizontal direction, and the test strip 90 may be held provided that the direction is a direction that is inclined with respect to the vertical direction (in other words, is not the vertical direction). Namely, of the angles formed by the direction of the central axis 15 and the vertical direction, the magnitude of the angles that are less than or equal to 90° is greater than 0° and less than or equal to 90°, and preferably greater than or equal to 30° and less than or equal to 90°, and more preferably greater than or equal to 45° and less than or equal to 90°, and even more preferably greater than or equal to 60° and less than or equal to 90°, and most preferably 90°, i.e., the horizontal direction.

Cut-out portions 42 that are rectangular are formed in two places of one of the long sides of the door member 40. This long side is divided into three scooping portions 43 that are shaped as tongue pieces by these cut-out portions 42 that are at two places. Further, sensing windows 26 that are rectangular are formed in the side surface of the holding member 20 at two places that are in the vicinity of the other long side of the door member 40.

As illustrated in FIG. 3 that shows a state in which the cap 21 and the door member 40 have been removed from the test strip holder 10, the opening portion 24 that is rectangular is provided in the side surface of the holding member 20 along the longitudinal direction. The door member 40 is provided at the opening portion 24 so as to be able to open and close. A sorting member 31 of the rotating member 30, which is accommodated in the interior of the holding member 20 and rotates within the holding member 20 with the central axis 15 being the rotation axis 15, can be seen from the opening portion 24. Length L1 of the opening portion 24 in the longitudinal direction is a length that is greater than or equal to the length L2 of the test strip 90 in the longitudinal direction, or, in other words, is a length of an extent that does not present problems with the test strip 90 being discharged from the opening portion 24. Further, an insertion opening 25 for inserting the test strip 90 into the holding member 20 is formed in the center of the front side of the holding member 20. Note that the opening portion 24 is provided in the cylindrical side surface of the holding member 20. For example, in a case in which the test strip holder 10 is placed horizontally, the opening portion 24 may be provided in the lower side portion of the side surface of the holding member 20. Note that it suffices for the opening portion 24 to be provided at an "outer surface" in a sense of including both the "side surface" and the "bottom surface", and not only at the "side surface", in the geometrical sense, of the holding member that is cylindrical.

Note that central line 24A that is shown by a dashed line in the drawings is an imaginary line that bisects the opening portion 24 along the longitudinal direction. Here, the central line 24A is at a position that is at the lower side in the rotation direction, with respect to an uppermost position 31A (FIG. 9) that the sorting member 31 at the interior of the holding member 20 reaches. Assuming that the rotational angle of this uppermost position 31A is 0°, the central line 24A is preferably at a position of a rotational angle of greater than or equal to 45° and less than or equal to 90°, and more preferably is at the position of 90°.

Figure 7:
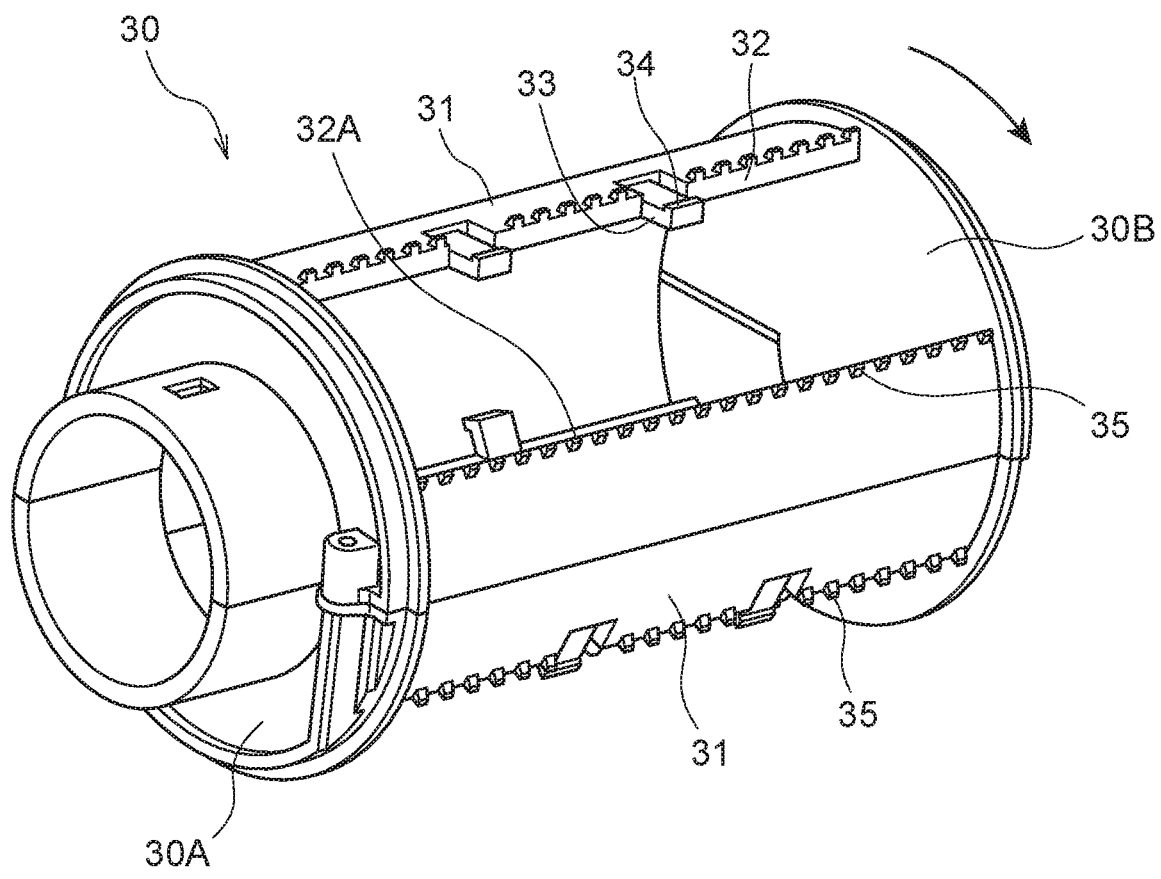
FIG. 7 illustrates, in a front perspective view, a rotating member that is accommodated in the test strip holder of FIG. 1.
Figure 8:
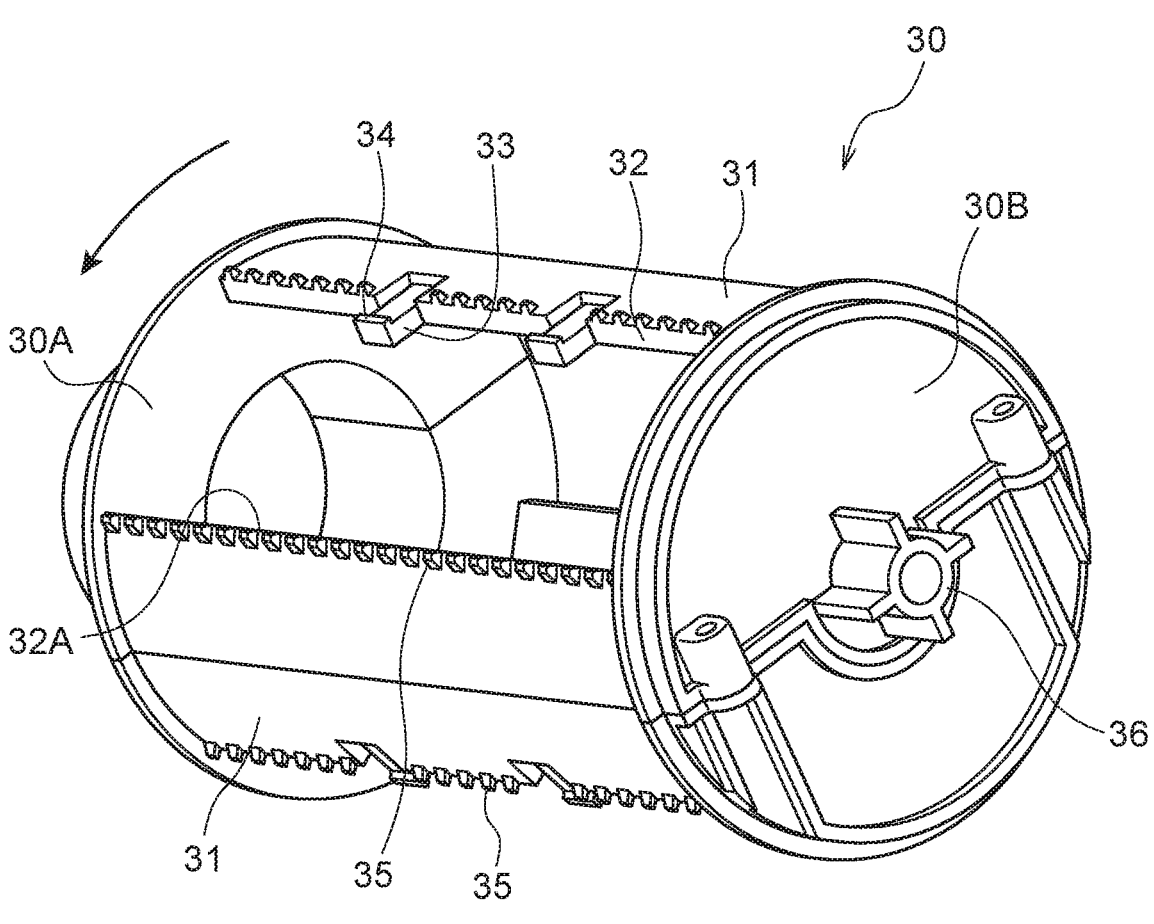
FIG. 8 illustrates the rotating member of FIG. 5 in a rear perspective view.

The rotating member 30 that is accommodated in the holding member 20 at the test strip holder 10 is illustrated in the front perspective view of FIG. 7 and the rear perspective view of FIG. 8. The rotating member 30 has a front plate 30A that is circular and positioned at the front side, and a rear plate 30B that is circular and is the same diameter as the front plate 30A and is positioned at the rear side so as to be apart from the front plate 30A by a distance that is longer than the length L2 of the long side of the test strip. Moreover, the rotating member 30 has a structure in which plural, and specifically, three, of the sorting members 31 are disposed between the front plate 30A and the rear plate 30B. The sorting members 31 are respectively provided so as to be apart by a distance that is longer than the length Y of the short side 91 of the test strip. The diameters of the front plate 30A and the rear plate 30B are the same as the diameter of the cylinder formed by the cylindrical surface 22 of the holding member 20. The front plate 30A and the rear plate 30B are fixed by the sorting members 31 such that the central axis of the circle of the front plate 30A and the central axis of the circle of the rear plate 30B coincide.

In other words, the central axis of the front plate 30A and the central axis of the rear plate 30B coincide, and this is the rotation axis 15 of the rotating member 30. The rotation driving shaft 36 projects out toward the rear side along the central axis of the rear plate 30B from the center of the circle of the rear plate 30B (FIG. 8). When the rotating member 30 is accommodated such that the outer peripheral surface of the front plate 30A and the outer peripheral surface of the rear plate 30B of the rotating member 30 contact the cylindrical surface 22 of the holding member 20, the central axis 15 of the holding member 20 and the central axis 15 of the rotating member 30 coincide because the diameter of the cylinder formed by the cylindrical surface 22, and the diameter of the front plate 30A and the diameter of the rear plate 30B, are the same.

The rotation driving shaft 36 is connected to the rotation driving device 3 that is described later. Due to rotational force from the rotation driving device 3 being transmitted, the entire rotating member 30 rotates in the direction of the arrows shown in FIG. 7 and FIG. 8. Thereby, the sorting members 31 rotate within the holding member 20 around the rotation axis 15 that coincides with the central axis 15, and thereby, the test strips 90 are moved at the interior of the holding member 20. Namely, the sorting members 31 are formed as bodies separate from the holding member 20, and rotate with respect to the holding member 20. In other words, the sorting members 31 rotate around the central axis 15 of the holding member 20 while maintaining a predetermined distance from the central axis 15.

A circular opening is provided in the front plate 30A at the center of the circle of the front plate 30A (FIG. 8), and a cylinder of the same outer diameter as this opening is fit therein (FIG. 7). The cylinder projects out forward from the front plate 30A. When the rotating member 30 is accommodated in the holding member 20, the cylinder is connected to the insertion opening 25 of the holding member 20. Accordingly, the test strip 90 that is inserted in the insertion opening 25 of the test strip holder 10 is held between the front plate 30A and the rear plate 30B.

The sorting members 31 are members that are substantially plate-shaped and are provided along the direction of the rotation axis 15. The sorting members 31 are mounted between the circular surface at the inner side of the front plate 30A and the circular surface at the inner side of rear plate 30B, so as to be apart from the rotation axis 15. The sorting member 31 has an outer peripheral surface that faces in the direction of the outer side of the rotating member 30, an inner peripheral surface that faces in the direction of the rotation axis 15, a first side surface that is parallel to the central axis 15 and faces in the rotating direction, and a second side surface that is parallel to the central axis 15 and faces in the direction of the side opposite the rotating direction. The inner peripheral surface and the outer peripheral surface are curved surfaces whose centers are the rotation axis 15. The first side surface and the second side surface are surfaces connecting the outer peripheral surface and the inner peripheral surface, and are flat surfaces that expand from the outer peripheral surface in the direction toward the central axis. Plural sliding projections 35 are disposed at the outer peripheral surface, along the edge between the outer peripheral surface and the first side surface. The sliding projections 35 are projections that fit into the inner peripheral grooves 23 provided at the cylindrical surface 22, at the time when the rotating member 30 is accommodated in the holding member 20. The sliding projections 35 are shaped as truncated cones whose bottom surfaces are square and that become pointed toward the outer side of the rotating member 30. The surfaces at the rotating direction sides of the sliding projections 35 are flat surfaces that expand toward the rotation axis 15, and form portions of the first side surface of the sorting member 31. The first side surface, which includes the rotating direction side surfaces of the sliding projections 35, is a distal end edge 32 of the sorting member 31.

Each of the sorting members 31 has a distal end edge 32 that corresponds to the distal end portion in the rotating direction and is parallel to the central axis. Two pushing pieces 33, which are rectangular parallelepiped and have predetermined lengths in the longitudinal direction, project out in parallel in the rotating direction from the distal end edge 32 by a predetermined distance D (see FIG. 10) that is longer than at least distance B. The number of the pushing pieces 33 is not limited to two. It suffices for the pushing pieces 33 to be able to hold the test strip 90 even during rotation, and the number thereof may be one or may be three or more. Further, the positions of the pushing pieces 33 in the longitudinal direction are not particularly limited, provided that they can hold the test strip 90 even during rotation. Moreover, a sorting piece 34 that is rectangular parallelepiped projects out from the distal end of the pushing piece 33 toward the outer side, i.e., toward the cylindrical surface 22 (FIG. 5). The plural sliding projections 35 are disposed at the outer peripheral surface of the sorting member 31 in rows along the distal end edge 32 and a rear end edge 32A respectively, toward the cylindrical surface 22 (FIG. 5). The sliding projections 35 provided at the outer peripheral surface of the sorting member 31, and the inner peripheral grooves 23 (FIG. 5) provided at the cylindrical surface 22 of the holding member 20, are formed as a structure of projections and indentations that mesh with each other. The pushing pieces 33 and the sorting pieces 34 are both fixed to the sorting member 31 that rotates around the central axis 15 of the holding member 20 while maintaining a predetermined distance from the central axis 15. Therefore, the pushing pieces 33 and the sorting pieces 34 also rotate around the central axis 15 while maintaining a predetermined distance from the central axis 15.

Figure 9:
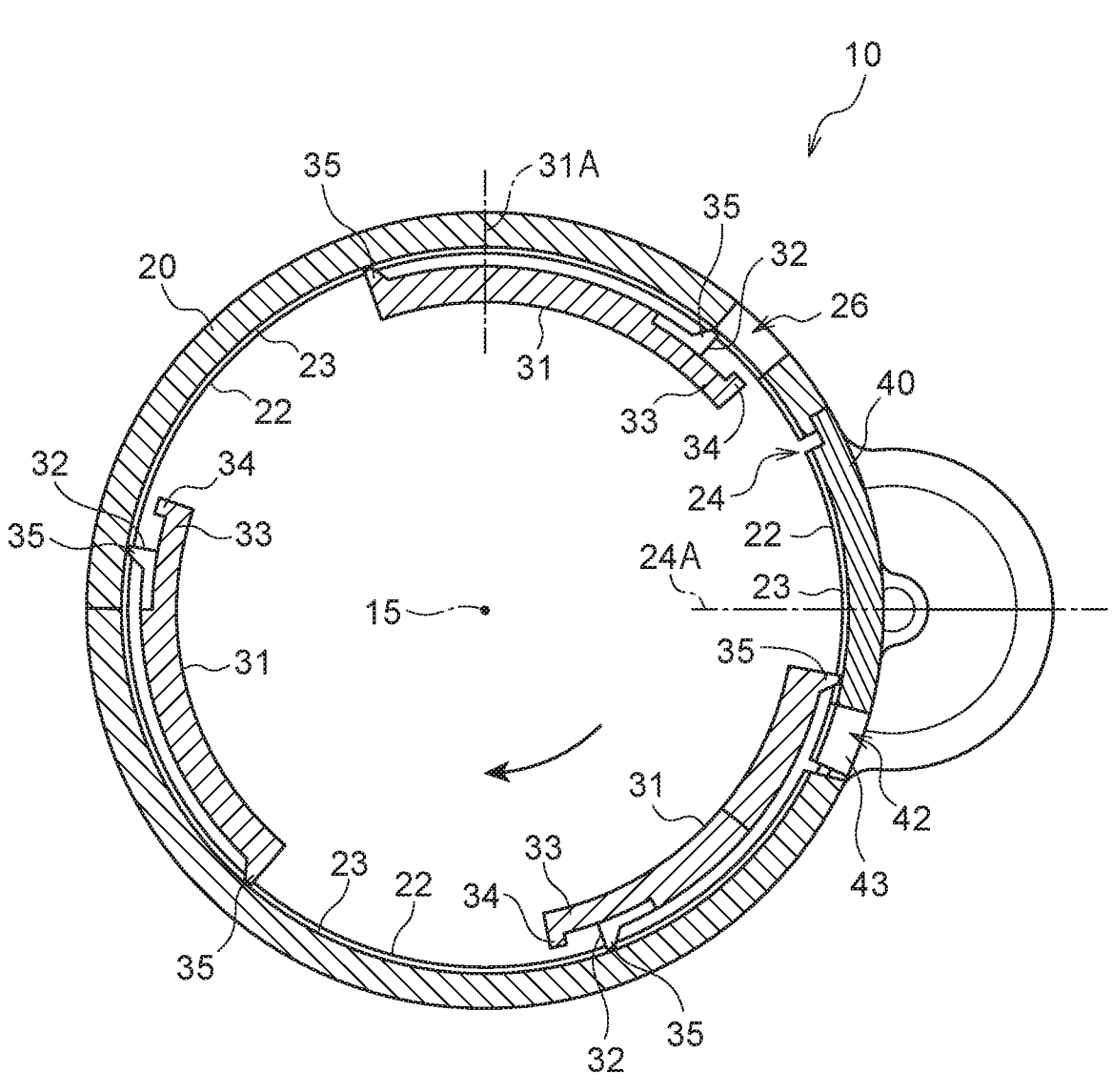
FIG. 9 is a cross-sectional view along line A-A' of FIG. 1.

FIG. 9 is a cross-sectional view along line A-A' of FIG. 1. The cylindrical surface 22 of the holding member 20 has a cross-section that is a substantially circular cross-section, and the inner peripheral surface of the door member 40 provided at the opening portion 24 is a circular arc shape that is flush with the cylindrical surface 22 of the holding member 20. Further, the three sorting members 31 have cross-sectional shapes that are approximately circular arc shaped, and are disposed uniformly with respect to the central axis 15. Note that the sorting members 31 do not absolutely have to be disposed uniformly, and the number thereof is not limited to three. However, the number of the test strips 90 that can be held in one round of the rotating member 30 increases in accordance with the number of the sorting members 31, and it is preferable that plural sorting members 31 be provided in order to improve the speed of taking out the test strips 90 from the test strip holder 10. On the other hand, the greater the number of sorting members 31, the narrower the interval between the front and rear sorting members 31, and the higher the probability of rotation without being able to hold the test strips 90. Therefore, the number of sorting members 31 is preferably three to five. Moreover, the sliding projections 35 that are provided at both the distal end side and the rear end side of the sorting member 31 fit in the inner peripheral grooves 23 of the cylindrical surface 22, and slide along the inner peripheral grooves 23 in the rotating direction that is shown by the arrows in the drawings. Note that, provided that two or more of the sliding projections 35 are provided, the test strip 90 becoming bitten-in between the sorting member 31 and the cylindrical surface 22 can be inhibited even if the sliding projections 35 and the inner peripheral grooves 23 are not meshing together as indentations and projections.

Figure 10:
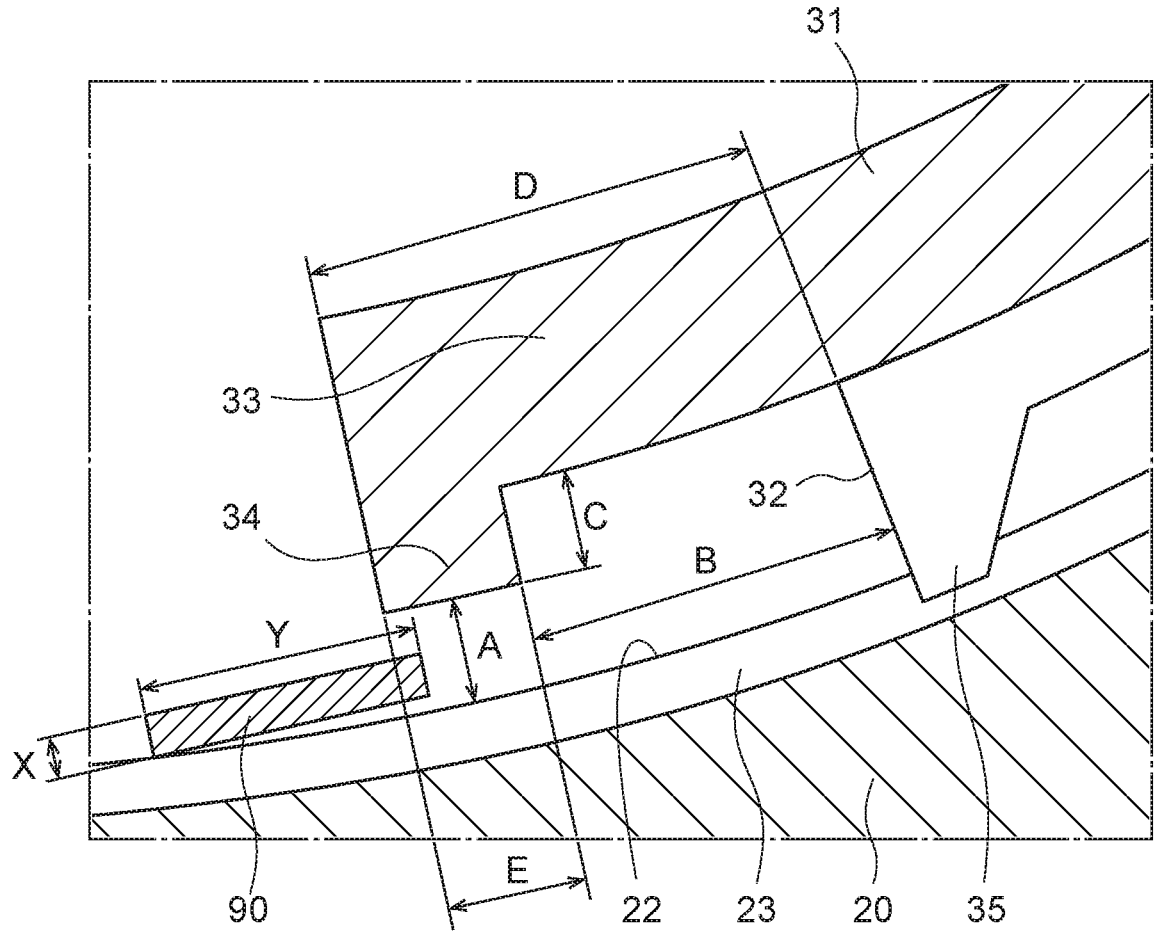
FIG. 10 illustrates a pushing piece and a sorting piece in an enlarged manner.

The positional relationships between the cylindrical surface 22, and the pushing piece 33 and the sorting piece 34 of the sorting member 31 are shown in the enlarged sectional view of FIG. 10. Namely, the distance between the cylindrical surface 22 and the position nearest to the cylindrical surface 22 at the distal end edge 32 of the sorting member 31 (i.e., the distal end of the sliding projection 35) is set to be less than the thickness X of the test strip 90 (FIG. 6C). Thereby, the test strip 90 becoming bitten-in between the sorting member 31 and the cylindrical surface 22 is inhibited, and the distal end edge 32 can push the test strip 90 in the rotating direction as the sorting member 31 rotates. Further, distance A between the cylindrical surface 22 and the position of the sorting piece 34 that is nearest to the cylindrical surface 22 is set to be greater than or equal to the thickness X of the test strip 90 and less than two times X.

Namely, the distance A is a distance such that one of the test strips 90 can enter in between the sorting piece 34 and the cylindrical surface 22, but two or more of the test strips cannot enter in. Thereby, two or more of the test strips 90 overlapping and simultaneously entering in between the pushing piece 33 and the cylindrical surface 22 is inhibited. Note that, from the standpoints of tolerating errors in manufacturing of the test strips 90 and ease of entry of the test strips 90, the distance A is preferably greater than or equal to 1.1 times the thickness X of the test strip 90, and more preferably greater than or equal to 1.2 times. Further, because the reagent pad 93 at the test strip 90 such as that described above is formed of a material such as filter paper or the like, there are cases in which, due to the reagent pad 93 being pressed, the thickness X becomes thinner than X. Accordingly, the distance A is preferably less than 1.8 times the thickness X of the test strip 90, and more preferably less than 1.6 times.

Further, the distance B from the distal end edge 32 of the sorting member 31 to the sorting piece 34, with respect to the length Y (FIG. 6B) in the short-length direction of the test strip 90, is set to be greater than or equal to Y and less than two times Y. Namely, the distance B is a distance that is such that one of the test strips 90 can enter-in in the rotating direction between the cylindrical surface 22 and the pushing pieces 33 that are disposed between the distal end edge 32 and the sorting pieces 34, but two or more of the test strips 90 cannot enter-in. Thereby, two or more of the test strips 90 being held so as to be lined-up in the rotating direction between the pushing pieces 33 and the cylindrical surface 22 is inhibited. Note that, from the standpoints of tolerating errors in manufacturing of the test strips 90 and ease of entry of the test strips 90, the distance B is preferably greater than or equal to 1.1 times the length Y of the test strip 90, and more preferably greater than or equal to 1.2 times. Further, there is a concern that two or more of the test strips will enter-in if the test strips 90 stand-up. Therefore, the distance B is preferably less than 1.8 times the length Y of the test strip 90, and more preferably less than 1.6 times.

Moreover, length C of the portion which projects out from the pushing piece 33 toward the cylindrical surface 22 at the sorting piece 34 is set to be greater than or equal to 0.5 times the thickness X of the test strip 90, and less than 1.5 times X. Namely, the length C is a distance that is such that the one test strip 90 that is between the cylindrical surface 22 and the pushing pieces 33 disposed between the distal end edge 32 and the sorting pieces 34 can be held, but two or more of the test strips 90 cannot be held. Due to these conditions of the distance B and the length C, even if the sorting member 31 (the pushing pieces 33) rotates while holding two or more of the test strips 90, immediately after the pushing pieces 33 reach the uppermost position 31A (i.e., when the pushing pieces 33 reach the position at which the vertically-downward vector is small), only the test strip 90 that is at the pushing pieces 33 side from the sorting member 31 is held at the inner sides of the projecting portions of length C of the sorting pieces 34, and the test strips 90 other than that cannot be held by the sorting pieces 34, and therefore, fall down. Note that length C being greater than or equal to 0.5 times the thickness X of the test strip 90 and less than 1.0 times X is more preferable from the standpoint that the test strips that are other than the one test strip 90 that is held do not at all contact the inner sides of the projecting portions of length C of the sorting pieces 34, and therefore, can reliably be made to drop down.

Further, distance E (see FIG. 10), which is the length of the sorting piece 34 in the rotating direction, with respect to the length Y of the test strip 90 in the short-length direction, is set to be less than Y, and preferably is less than 0.5 times the length Y of the test strip 90. Due to this condition of the distance E, the test strip that is held between the sorting pieces 34 and the cylindrical surface 22 can fall down immediately after the uppermost position 31A is reached. Note that the distance E is substantially the same length as the distance obtained by subtracting the distance B from the distance D.

Figure 11:
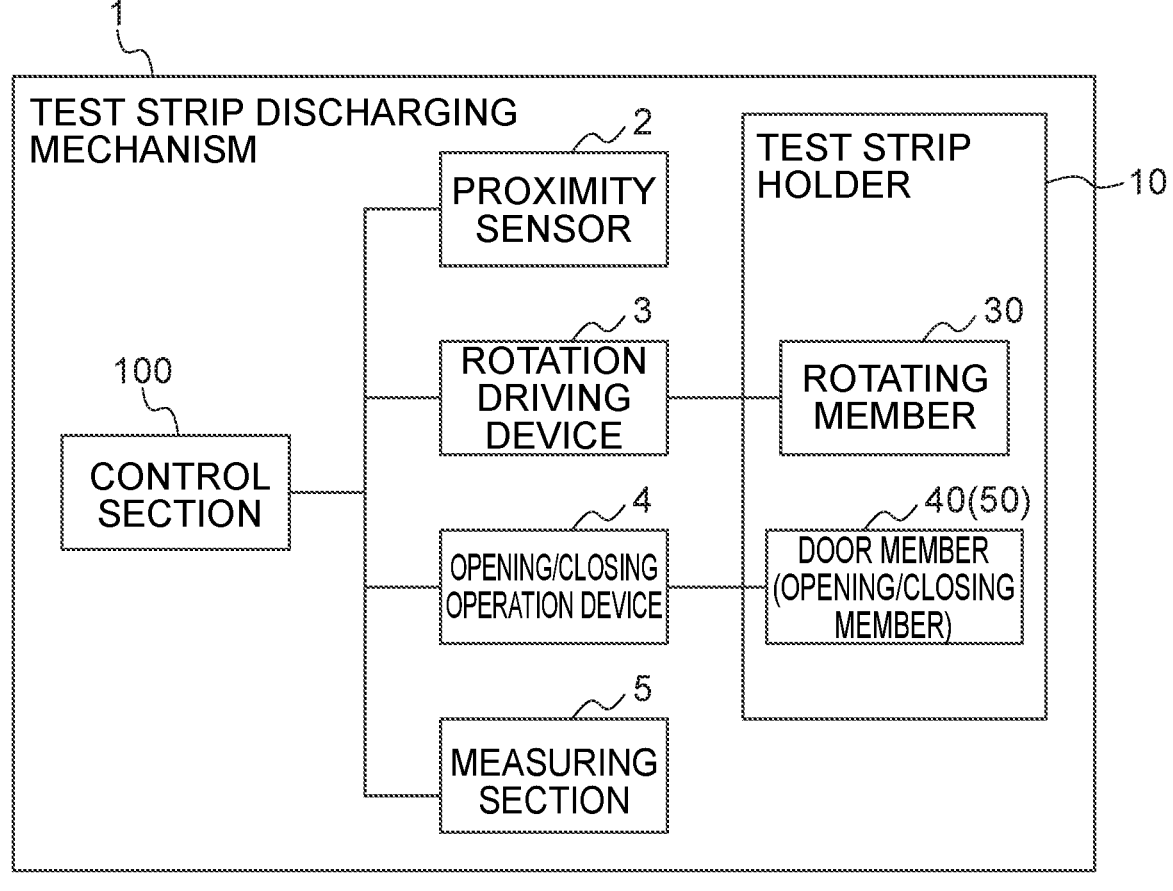
FIG. 11 is a functional block drawing of a test strip discharging mechanism.

A functional block drawing of the test strip discharging mechanism 1 is illustrated in FIG. 11. The test strip discharging mechanism 1 is structured as a measuring apparatus that measures, by the test strip 90 to which a specific reagent has been applied, the concentration of or the absence or presence of a physical characteristic or a specific component of a biological specimen such as, for example, a urine sample.

A control section 100 controls the respective sections of the test strip discharging mechanism 1. The control section 100 controls a proximity sensor 2, the rotation driving device 3, the opening/closing operation device 4, and a measuring section 5 by hardware structures described later. When the test strip holder 10 is attached to the test strip discharging mechanism 1, as described above, the rotation driving device 3 is connected to the rotation driving shaft 36 (FIG. 8) of the rotating member 30, and further, the opening/closing operation device 4 is connected to the door driving shaft 46 (FIG. 4) of the door member 40. The proximity sensor 2 is structured by, for example, an optical sensor or a proximity sensor or the like, and, through the sensing windows 26 (FIG. 9) of the holding member 20, senses the approach of the sorting member 31 to the opening portion 24. Note that the proximity sensor 2 may sense the approach of the test strip 90 that is held at the sorting member 31. In accordance with the sensing by the proximity sensor 2, the control section 100 drives the rotation driving device 3, and rotates or stops the rotating member 30 (the sorting members 31). Further, in accordance with the sensing by the proximity sensor 2, the control section 100 drives the opening/closing operation device 4, and opens or closes the door member 40. Note that, in a case in which an opening/closing member 50 (see FIG. 22) which is not the door member 40 is provided at the opening portion 24, the opening/closing operation device 4 opens and closes the opening/closing member 50 instead of the door member 40. Further, the control section 100 also controls the measuring section 5 that serves as a measuring apparatus and is structured by various portions and devices.

Figure 12:
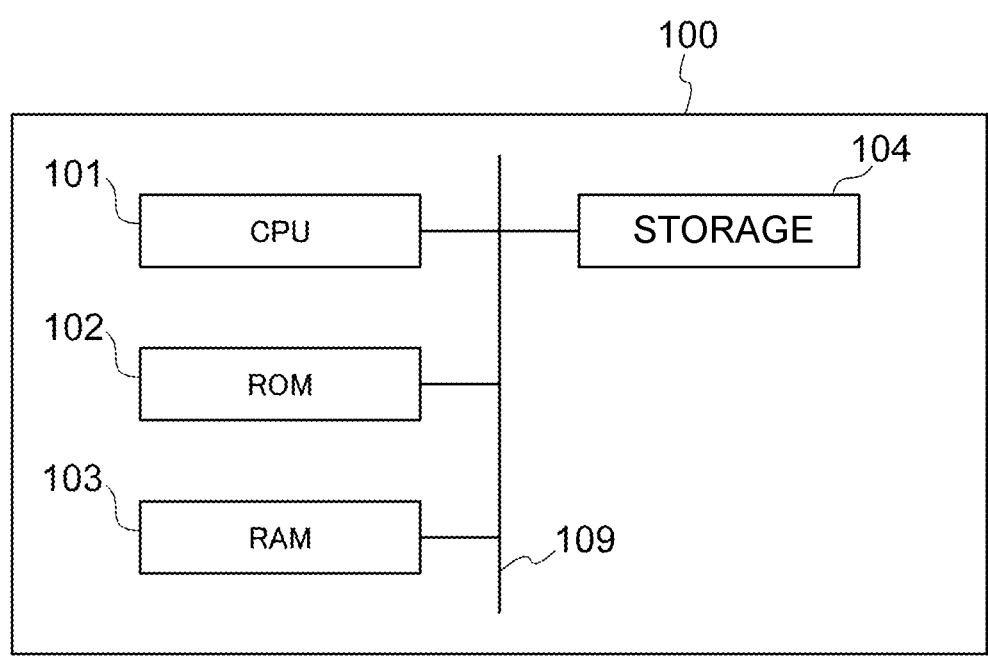
FIG. 12 is a block drawing illustrating hardware structures of a control section of FIG. 11.

As illustrated by the hardware structures in FIG. 12, the control section 100 has a CPU (Central Processing Unit) 101, a ROM (Read Only Memory) 102, a RAM (Random Access Memory) 103, and a storage 104. These respective structures are connected so as to be able to communicate with one another via bus 109.

The CPU 101 is a central computing processing unit, and executes various programs and controls respective sections. Namely, the CPU 101 reads-out a program from the ROM 102 or the storage 104, and executes the program by using the RAM 103 as a workspace. The CPU 101 carries out control of the above-described respective structures, and various computing processings, in accordance with programs recorded in the ROM 102 or the storage 104.

The ROM 102 stores various programs and various data. The RAM 103 temporarily stores programs and data as a workspace. The storage 104 is structured by an HDD (Hard Disk Drive), an SSD (Solid State Drive) or a flash memory, and stores various programs, including the operating system, and various data. In the present aspect, programs and various data relating to measurements and judgments are stored in the ROM 102 or the storage 104. Further, measured data also can be stored in the storage 104.

The control section 100 executes control of the proximity sensor 2, the rotation driving device 3, the opening/closing operation device 4 and the measuring section 5 due to, among the above-described hardware structures, the CPU 101 executing the above-described programs.

Due to the above-described structure, by control of the control section 100, the rotation driving device 3 can stop the rotation of the sorting member 31 when the sorting member 31 approaches the opening portion 24, and can restart rotation of the sorting member 31 when the opening/closing operation device 4 closes the opening portion 24. The control section 100 can also carry out control such that this operation of the opening/closing operation device 4 is carried out due to the proximity sensor 2 sensing the approach of the sorting member 31. Moreover, the control section 100 can control the stopping of rotation by the rotation driving device 3 due to the proximity sensor 2 sensing the approach of the sorting member 31, and can control the restarting of rotation by the rotation driving device 3 when the opening/closing operation device 4 closes the opening portion 24.

Figure 13A:
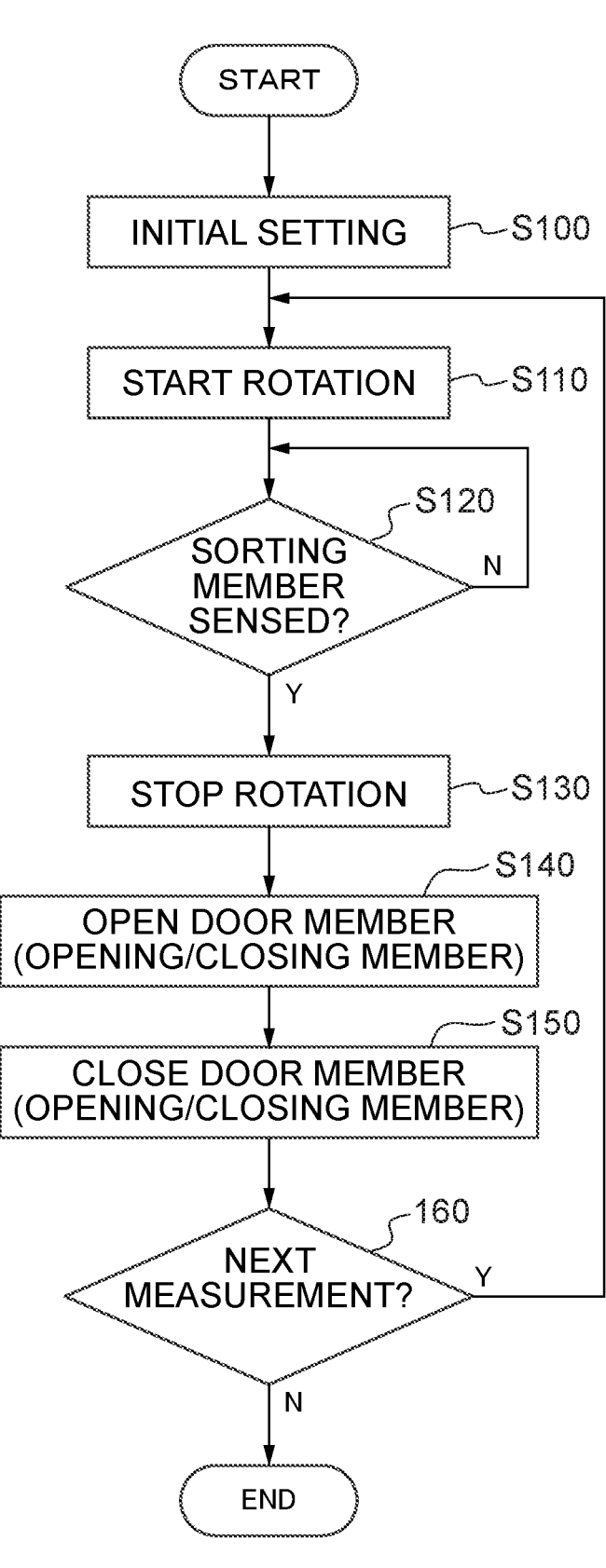
FIG. 13A is a flowchart illustrating an overview of test strip discharging processing.
Figure 13B:
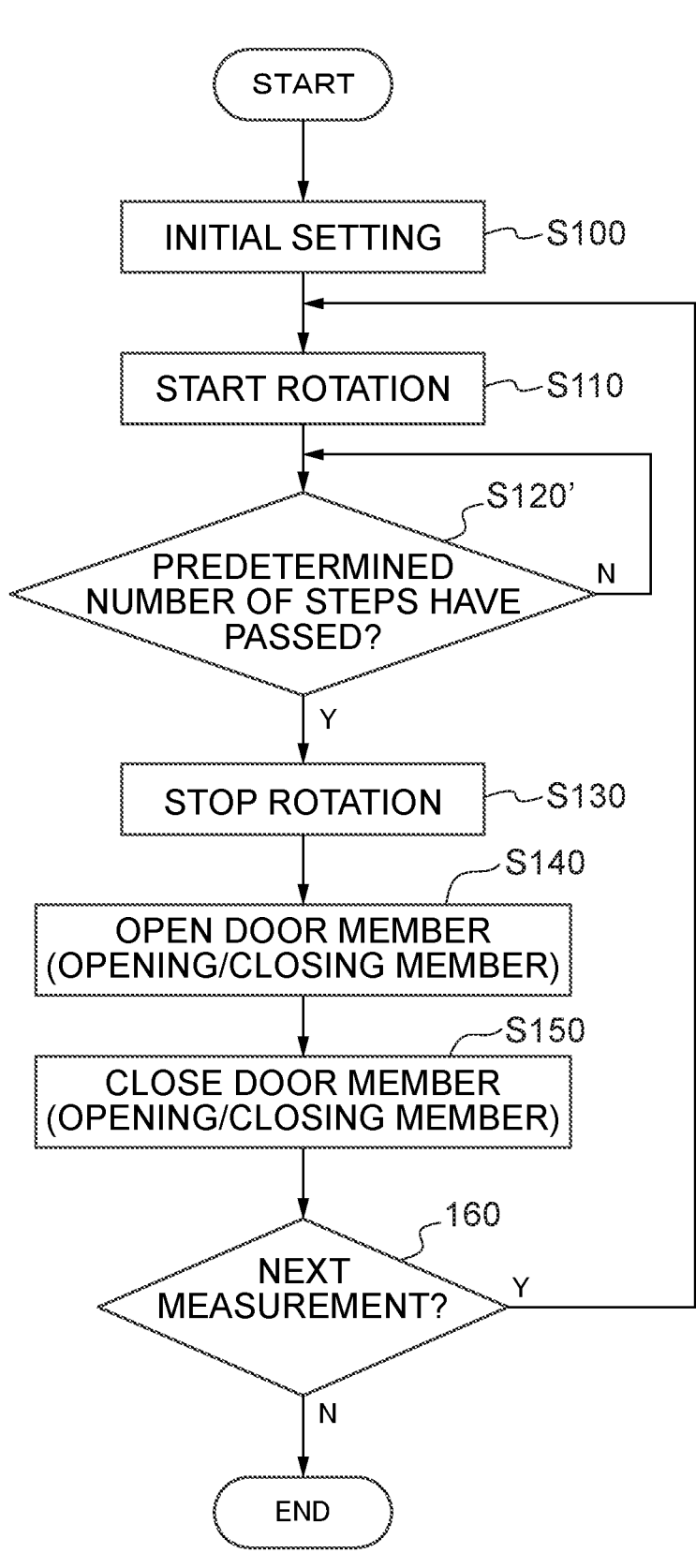
FIG. 13B is a flowchart illustrating an overview of test strip discharging processing.

The taking-out of the test strip 90 by the test strip holder 10 of the present exemplary embodiment is described next with reference to the flowchart of FIG. 13A (or FIG. 13B) and the cross-sectional views of FIG. 14A to FIG. 14E. Note that the cross-sectional views of FIG. 14A to FIG. 14E explain operation focusing on one of the sorting members 31, but, of course, operations at the other two sorting members 31 also are executed concurrently.

First, when the power of the test strip discharging mechanism 1 is turned on, initial setting of the devices is executed in the step shown in S100. This initial setting also includes setting the rotating member 30 at its initial position of rotation due to the control section 100 controlling the rotation driving device 3.

Then, after preparations for measurement have been completed, in the step shown in S110, the control section 100 drives the rotation driving device 3 and starts rotation of the rotating member 30. In the step shown in S120, the control section 100 continues the rotation of the rotating member 30 until the proximity sensor 2 senses the sorting member 31 through the sensing windows 26. Note that, in the case of a structure that does not have the proximity sensor 2 and that employs, for example, a step motor as the rotation driving device 3, in the step shown in S120' in the flowchart of FIG. 13B, the control section 100 can continue the rotation of the rotating member 30 until a predetermined number of steps have passed (e.g., the number of steps needed until the next sorting member 31 approaches the opening portion 24 after stoppage of rotation and restarting of rotation).

Figure 14A:
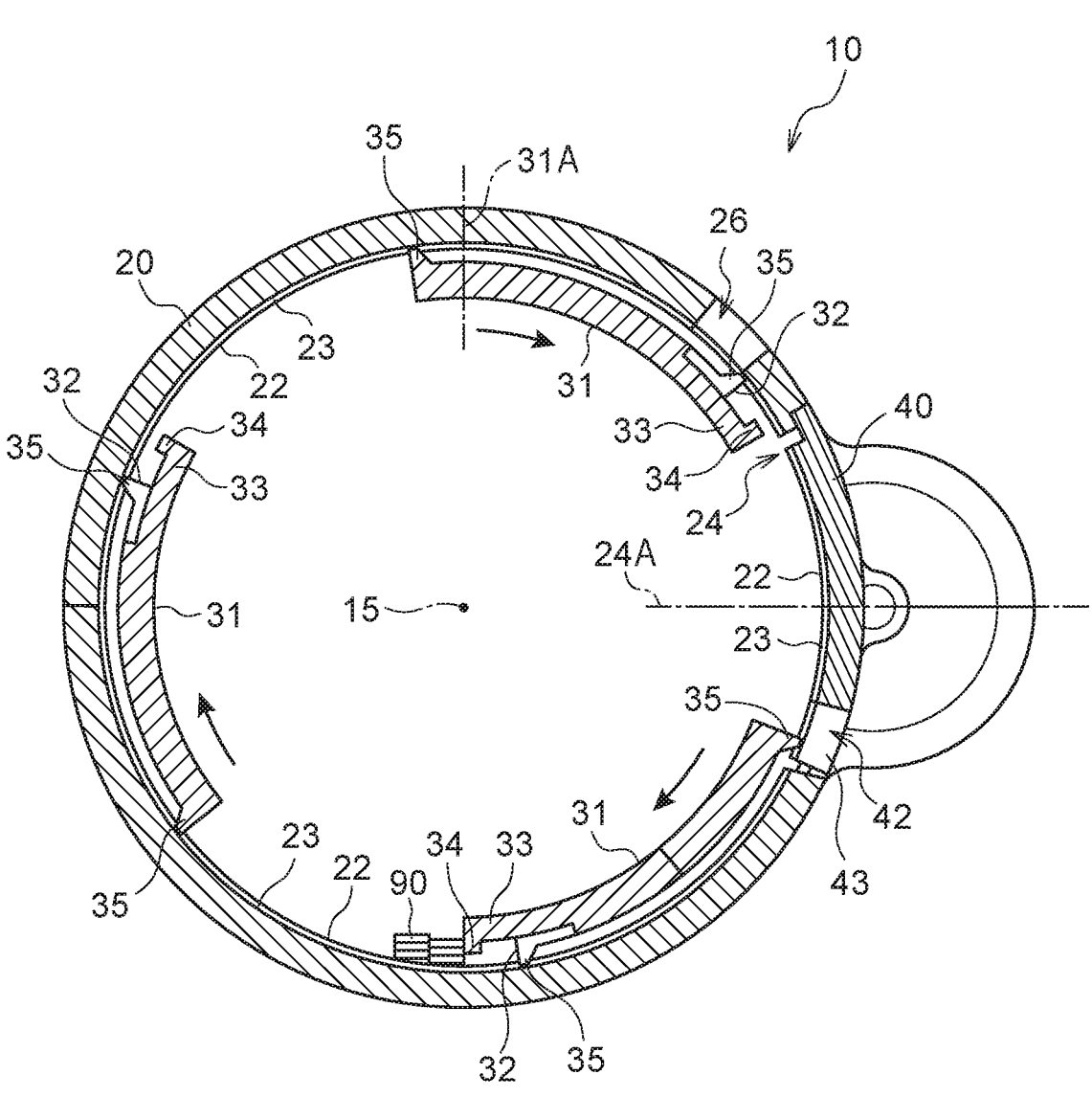
FIG. 14A illustrates a state of holding the test strip, in a cross-sectional view.

During this time, in FIG. 14A, the plural test strips 90 stay at the lower portion of the interior space of the holding member 20. The pushing pieces 33 of the sorting member 31 push, in the rotating direction, these plural test strips 90 that are staying there.

Figure 14B:
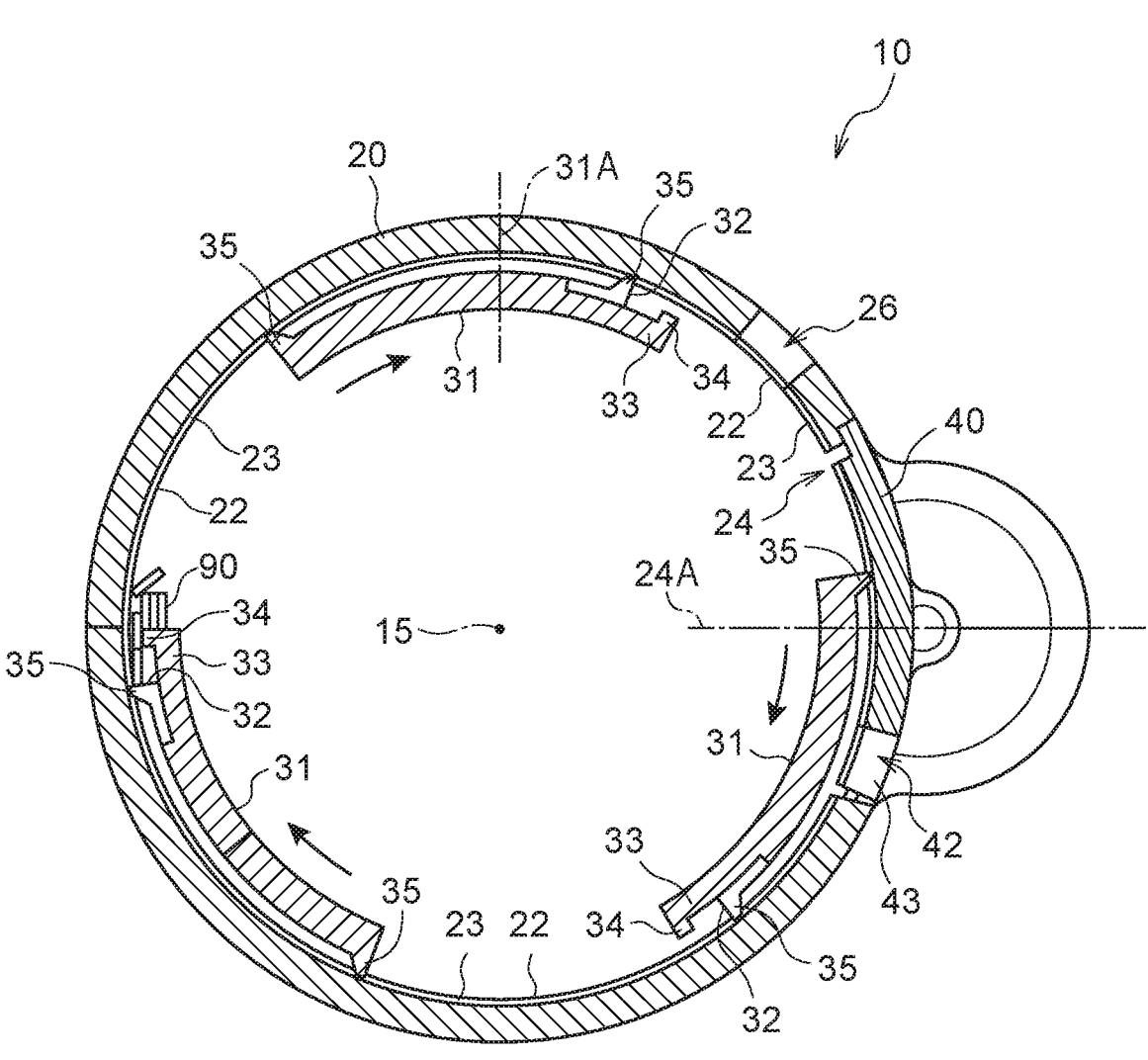
FIG. 14B illustrates a state of holding the test strip, in a cross-sectional view.

When the sorting member 31 continues to rotate and comes to a position past the lowermost position in the vertical direction as illustrated in FIG. 14B, only one of the test strips 90 that were positioned at the outermost side slips through the gap of width A (see FIG. 10) that is between the sorting pieces 34 and the cylindrical surface 22, and enters in to a position at which the long side 92 thereof is made to contact the distal end edge 32. Note that there are cases in which only a portion of another test strip 90 as well enters into the gap between the sorting pieces 34 and the cylindrical surface 22. The other test strips 90 are raised up by the pushing pieces 33.

Figure 14C:
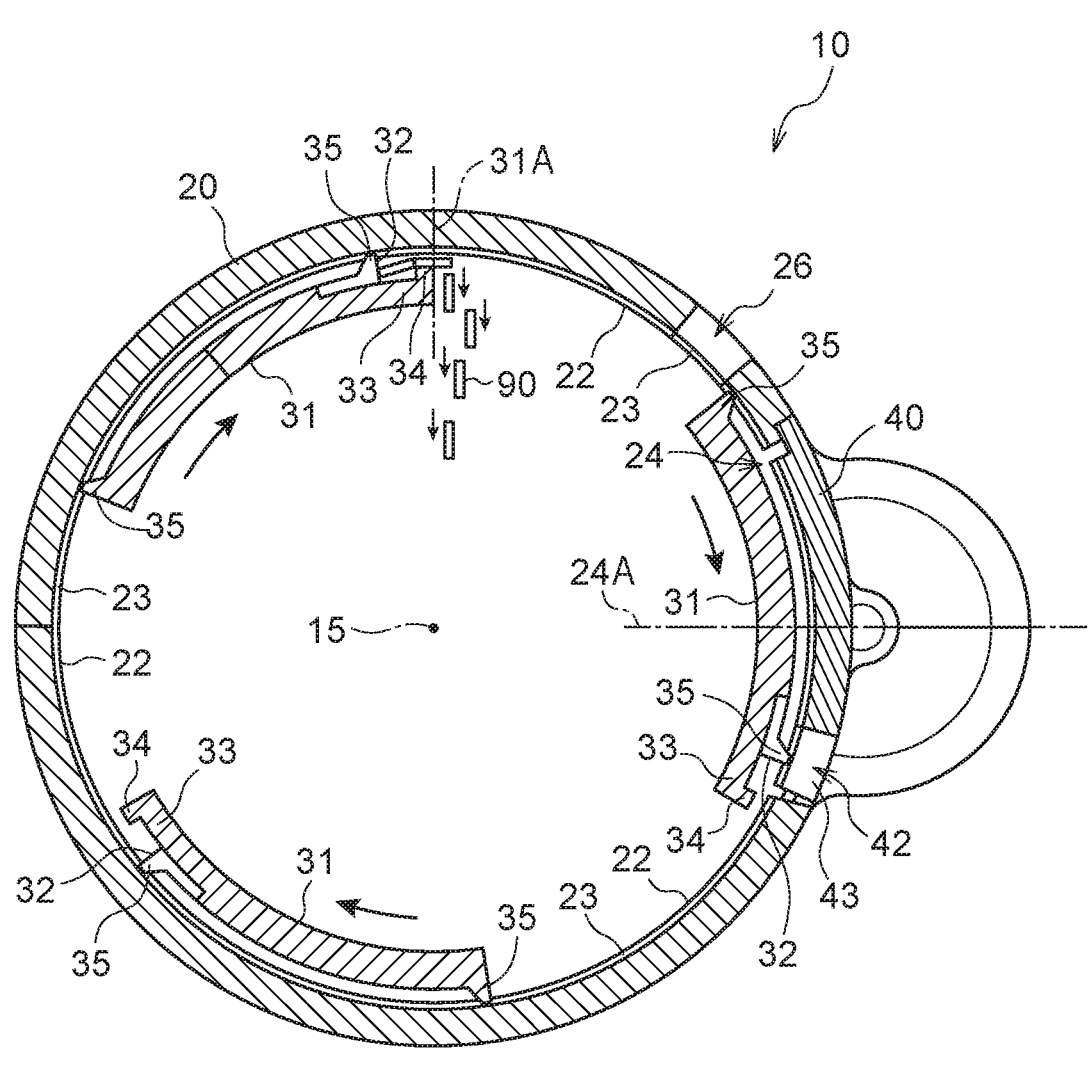
FIG. 14C illustrates a state of holding the test strip, in a cross-sectional view.
Figure 14D:
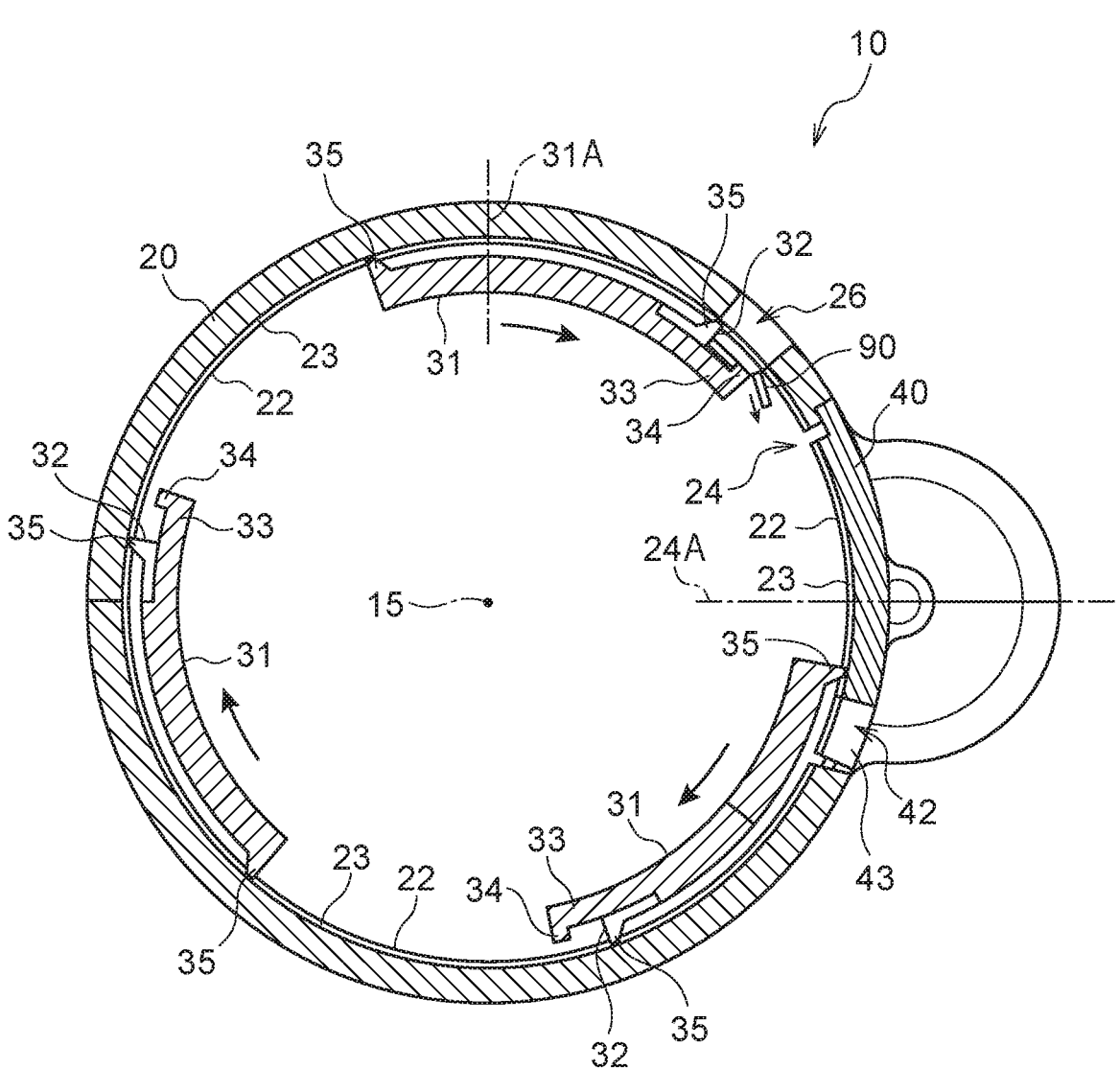
FIG. 14D illustrates a state of holding the test strip, in a cross-sectional view.

When the sorting member 31 continues to rotate further, and the pushing pieces 33 reach the uppermost position 31A as illustrated in FIG. 14C, all of the test strips 90 that could not enter into the gap between the sorting pieces 34 and the cylindrical surface 22 fall downward. Then, when the sorting member 31 rotates further to the position shown in FIG. 14D, the test strip 90, at which only a portion thereof entered into the gap between the sorting pieces 34 and the cylindrical surface 22, also falls down ultimately, but the test strip 90, which entered in up to the point of contacting the distal end edge 32, is held by the pushing pieces 33 and the sorting pieces 34 and avoids falling down.

Namely, due to the distance A between the cylindrical surface 22 and the nearest position of the sorting piece 34 to the cylindrical surface 22 satisfying X≤A<2X, only one of the test strips 90 is held at a position that is rotated slightly from the uppermost position 31A due to the sorting member 31 rotating. Note that, due to the distance B from the distal end edge 32 of the pushing piece 33 to the sorting piece 34 satisfying Y≤B<2Y, and the length C of the portion of the sorting piece 34 that projects out from the pushing piece 33 toward the cylindrical surface 22 satisfying 0.5X≤C<1.5X, the sorting member 31 can be set in a state of even more reliably holding only the test strip 90 at a position that is rotated slightly from the uppermost position 31A.

Figure 14E:
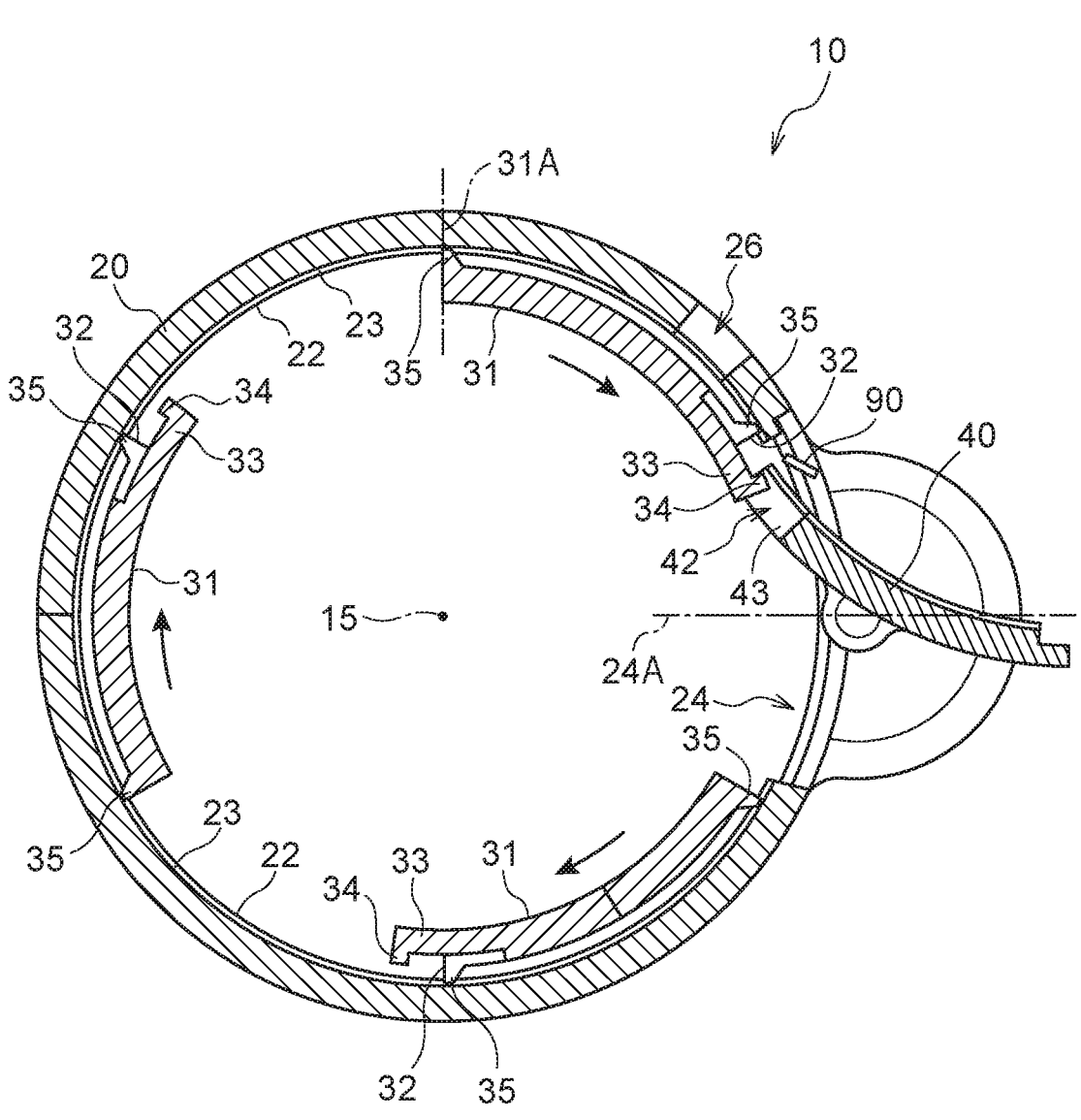
FIG. 14E illustrates a state in which the test strip is discharged, in a cross-sectional view.

Further, when the sorting member 31 rotates to the position illustrated in FIG. 14E, in the step shown in S120, the proximity sensor 2 senses the approach of the sorting member 31 (or, in the step shown in S120', the control section 100 senses the passage of the predetermined number of steps), and, in the step shown in S130, the control section 100 stops driving of the rotation driving device 3, and rotation of the sorting member 31 stops. Then, in the next step shown in S140, the control section 100 drives the opening/closing operation device 4, and rotates and opens the door member 40 to the state illustrated in FIG. 14E.

Due to this rotation of the door member 40, simultaneously with the cut-out portions 42 reaching the positions of the pushing pieces 33, the scooping portions 43 collide with the pushing pieces 33 or the test strip 90. Due to this collision, impact is applied to the test strip 90 that was held by the pushing pieces 33 and the sorting pieces 34, and the test strip 90 falls down from the sorting member 31 toward the opened door member 40. The test strip 90 slides down the concavely curved surface of the door member 40, is discharged to the outer side from the holding member 20, and thereafter, the test strip 90 is moved by unillustrated conveying means to the measuring section 5, and is provided to the predetermined measurement thereat.

Then, in the step shown in S150, the control section 100 again drives the opening/closing operation device 4, rotates the door member 40 reversely, and again closes the door member 40 as in the state illustrated in FIG. 14A. For the timing of closing the door member 40, a discharge sensor that senses that the test strip 90 has been discharged to the outer side from the holding member 20 may be provided, and the door member 40 may be closed due to the discharging of the test strip 90 being sensed by the discharge sensor. Otherwise, the door member 40 may be closed after a predetermined time has elapsed from the opening thereof. Then, in the step shown in S160, the control section 100 judges whether or not there is a next measurement. If there is a next measurement, the control section 100 again returns to the step shown in S110, and drives the rotation driving device 3, and restarts the rotation of the rotating member 30.

In this way, because the door member 40 is opened only during the discharging of the test strip 90 from the holding member 20, even if the flow line for the time of opening and closing the door member 40 is on the flow line by which the sorting member 31 rotates, the movement of the sorting member 31 is not affected. In addition, in a case of using the holding member 20 that is airtight except for the door member 40, the test strips 90 that are accommodated in the holding member 20 can be cut-off from outside air except at the time when the door member 40 is opened. Thereby, changes in the quality of the test strips 90 due to humidity of the outside air or the like can be prevented.

(2) Second Exemplary Embodiment

Figure 15:
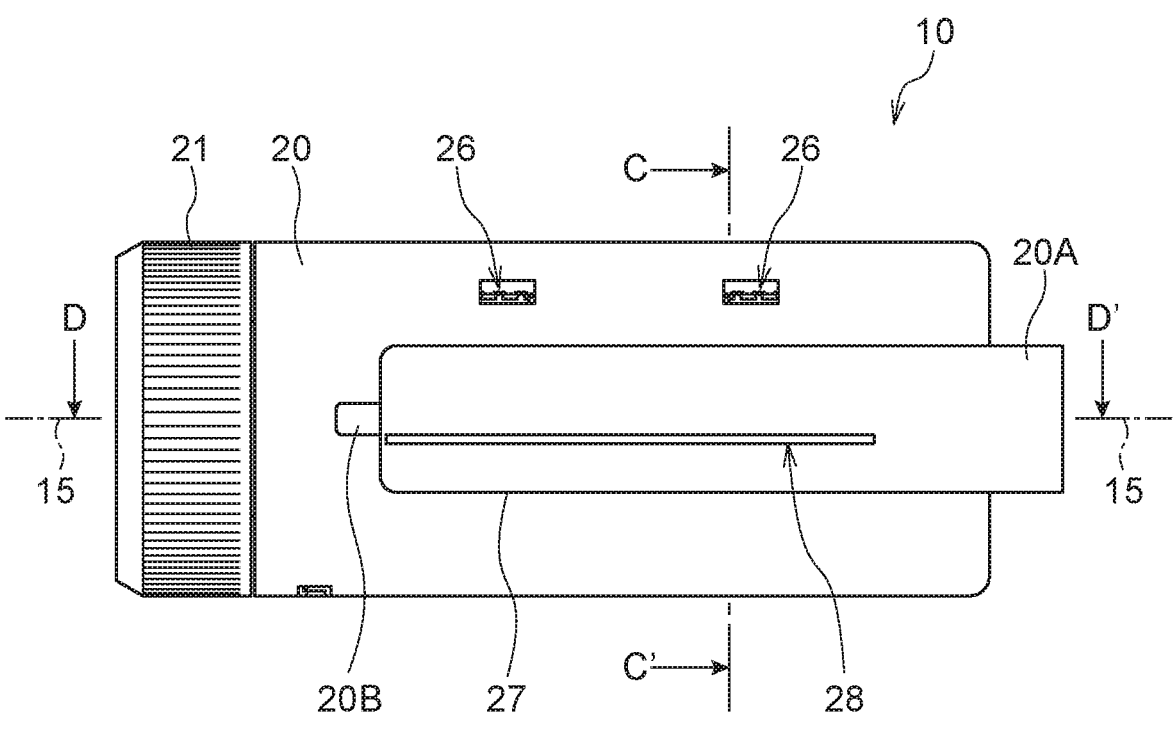
FIG. 15 illustrates a test strip holder of a second exemplary embodiment in a front view.
Figure 16:
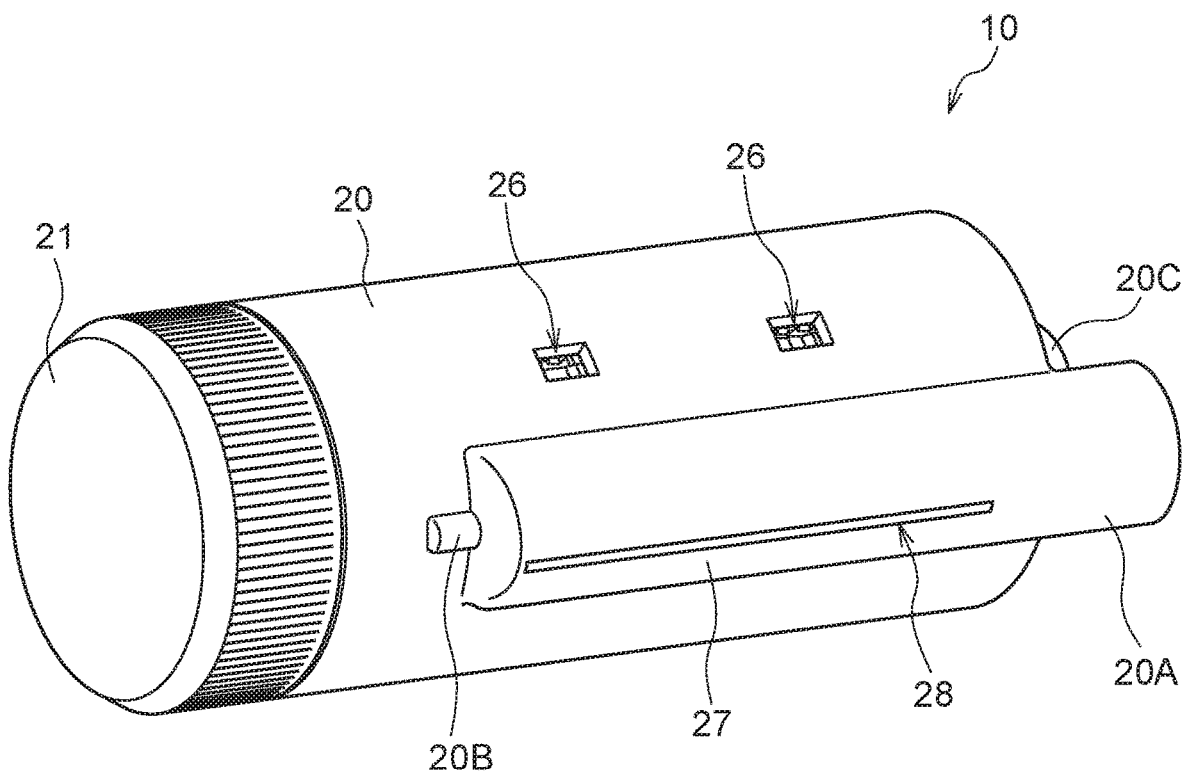
FIG. 16 illustrates the test strip holder of FIG. 15 in a front perspective view.

The test strip holder 10 in which the door member 40 is made into a different form is illustrated in FIG. 15 and FIG. 16 in a front view and in a front perspective view, respectively. A door accommodating portion 27 that is shaped as a cylinder and projects outward is provided at the side surface of the holding member 20. The door accommodating portion 27 is a shape in which a portion of a solid cylinder, whose diameter is smaller than the holding member 20 and whose length in the longitudinal direction is greater than or equal to the length of the test strip 90, projects outward from the holding member 20. Further, a discharge opening 28, which is an opening of the same length or longer than the test strip 90, is provided along the longitudinal direction of the door accommodating portion 27. The discharge opening 28 communicates the interior and the exterior of the door accommodating portion at the lower side of the door accommodating portion 27.

Figure 17:
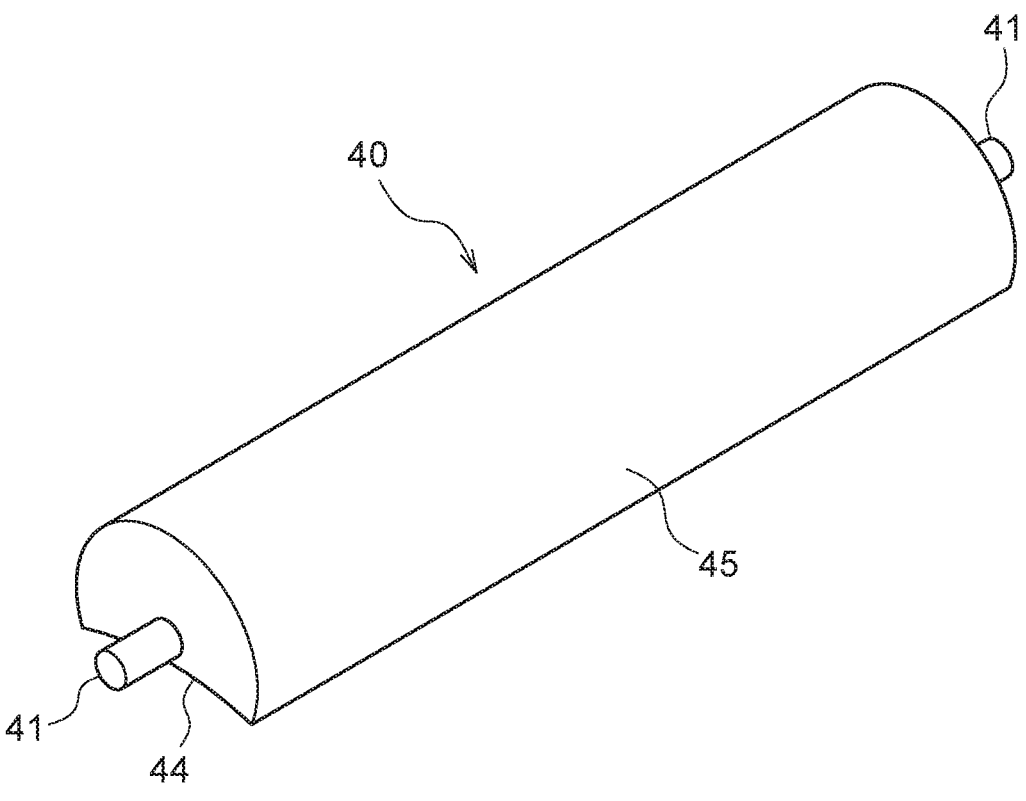
FIG. 17 is an outer perspective view of the door member.
Figure 18:
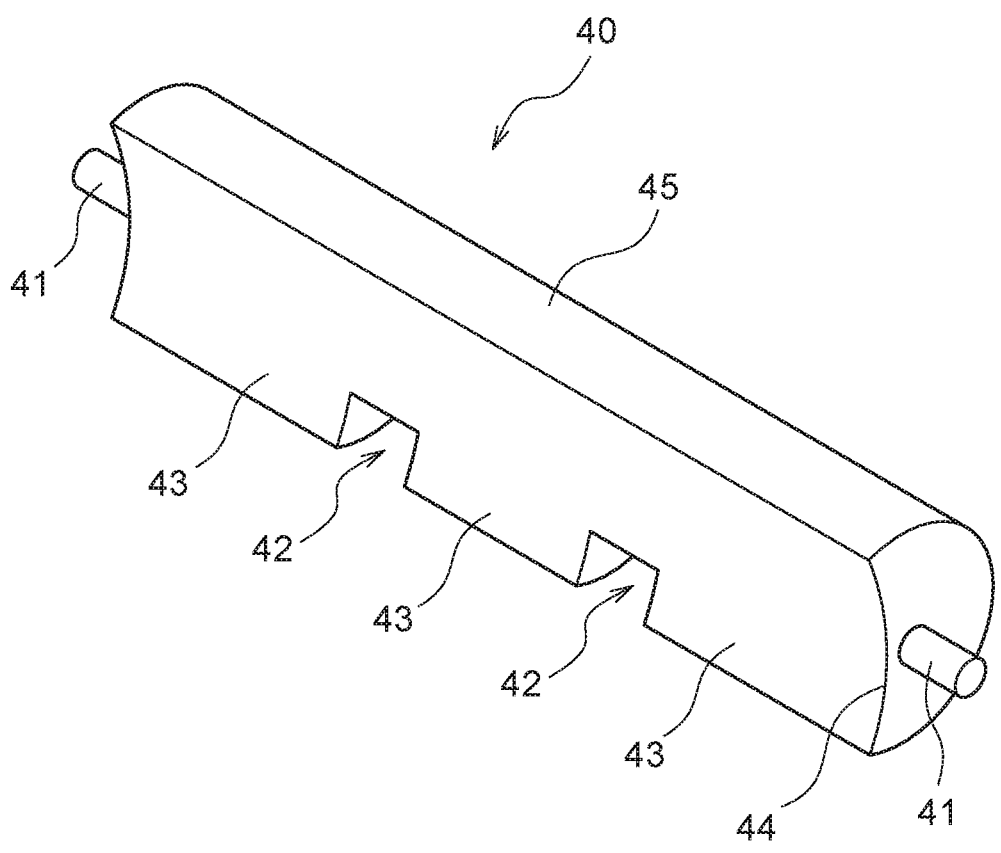
FIG. 18 is an inner perspective view of the door member.

The door member 40, which is the shape illustrated in an outer perspective view in FIG. 17 and in an inner perspective view in FIG. 18, is accommodated in the door accommodating portion 27. The door member 40 has a shape that is substantially crescent-shaped in cross-section, as if a portion of the side surface of a solid cylinder has been hollowed out at the concavely curved surface of the cylindrical surface 22 of the holding member 20. The convexly curved surface of this side surface is called a cutting-off portion 45, and the concavely curved surface is called an inclined surface 44. The cut-out portions 42 that are rectangular may be formed in two places of the lower edge of the inclined surface 44. This lower edge is divided, by these cut-out portions 42 that are at two places, into the three scooping portions 43 that are shaped as tongue pieces. The door shafts 41, which are provided on an axial center of the solid cylinder of the door member 40, project out from the both ends of the door member 40.

The front side of the door accommodating portion 27 is connected to the bearing 20B that is cylindrical and has a smaller diameter than the door accommodating portion 27 and bulges out from the side surface of the holding member 20. One of the door shafts 41 is accommodated in this bearing 20B. Further, the sensing windows 26 that are rectangular are formed at two places in a vicinity above the door accommodating portion 27. The door member 40 is provided at the side surface of the holding member 20 in a direction running along the longitudinal direction of the holding member 20.

On the other hand, the driving shaft accommodating portion 20A, which is cylindrical and bulges outward and is connected to the door accommodating portion 27, is provided at the another end side of the holding member 20. The door driving shaft 46 (see FIG. 4) is accommodated in this driving shaft accommodating portion 20A. The door driving shaft 46 and the door shafts 41 have the same axial centers. The door driving shaft 46 is held by the opening/closing operation device 4 (see FIG. 11) that is similar to the first exemplary embodiment. Due to the door driving shaft 46 rotating around the axial center, the door member 40 rotates. Moreover, the connecting portion 20C that is cylindrical and has a slightly smaller diameter projects out at the another end side of the holding member 20. This connecting portion 20C is connected to the rotation driving device 3 (see FIG. 11) when the test strip holder 10 is attached to the test strip discharging mechanism 1 that is similar to the first exemplary embodiment. The rotation driving shaft 36 of the rotating member 30 (FIG. 7, FIG. 8) that is similar to the first exemplary embodiment can be seen from an opening provided in the center of the connecting portion 20C.

The sorting members 31 rotate and move the test strips 90, which are accommodated in the holding member 20, along the cylindrical surface 22 that is the inner peripheral surface of the holding member 20. The door member 40 is provided at the side surface of the holding member 20 so as to be able to open and close, in order to discharge the test strip 90 to the exterior of the holding member 20. When closed, the door member 40 cuts-off the interior and the exterior of the holding member 20 from one another. The door accommodating portion 27 covers the door member 40 from the outer side of the holding member 20. The door member 40 can open and close by rotating at the interior of the door accommodating portion 27.

The discharge opening 28 is provided in order to discharge, to the exterior of the door accommodating portion 27, the test strip that has been discharged to the exterior of the holding member 20, i.e., into the door accommodating portion 27. The discharge opening 28 can be opened and closed with respect to the exterior by the door member 40 that rotates within the door accommodating portion 27. Namely, when the discharge opening 28 is closed, the interior and the exterior of the door accommodating portion 27 are cut-off from each other. On the other hand, when the discharge opening 28 is open, the door member 40 closes the opening portion 24 of the holding member 20 as will be described later.

Figure 19:
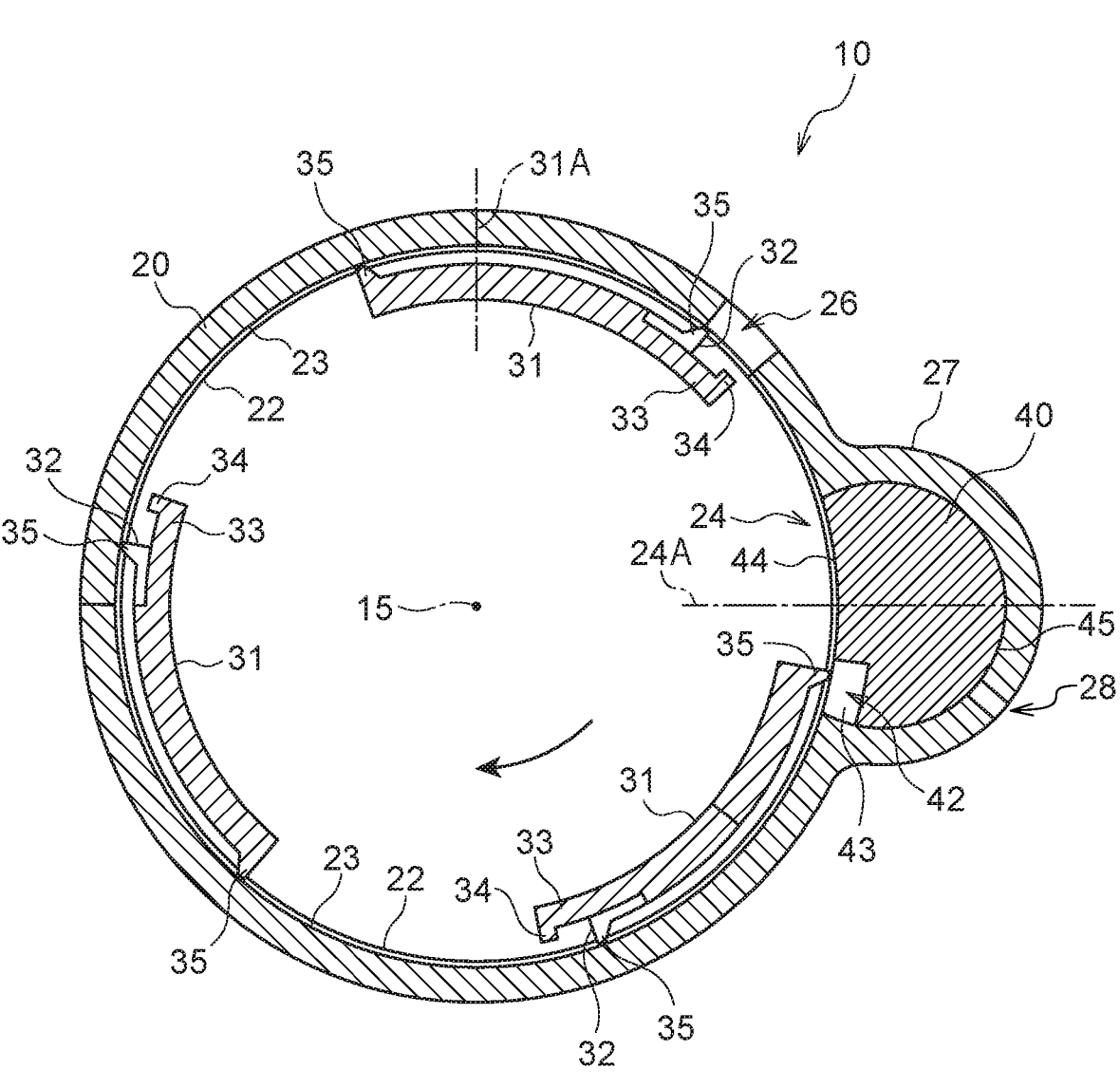
FIG. 19 is a cross-sectional view along line C-C' of FIG. 15.

The inclined surface 44 of the door member 40 is the inner peripheral surface that is shaped as a concave surface and is flush with the cylindrical surface 22 that is the inner side surface of the holding member 20, at the time when the door member 40 is closed as illustrated in FIG. 19. The cutting-off portion 45 that is at the side opposite the inclined surface 44 is shaped as a cylindrical, convex surface that corresponds to the cylindrical, concave surface of the interior of the door accommodating portion 27. At the time when the door member 40 is closed as illustrated in FIG. 19, the cutting-off portion 45 closes both the opening portion 24 and the discharge opening 28. On the other hand, at the time when the discharge opening 28 is open as illustrated in FIG. 20C, the cutting-off portion 45 cuts the interior of the holding member 20 off from the exterior.

Figure 20A:
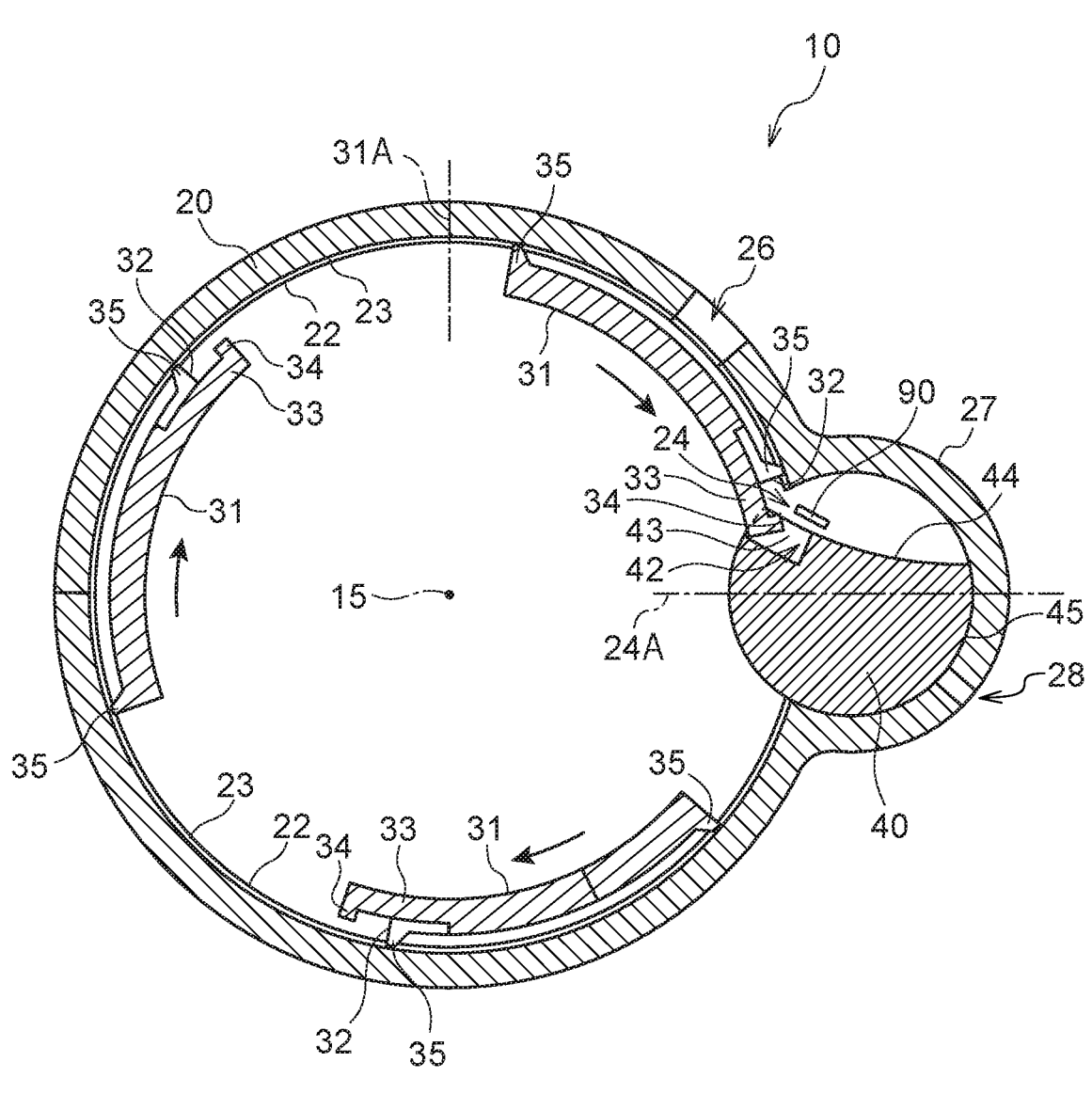
FIG. 20A illustrates a state in which the test strip is discharged, in a cross-sectional view.

Namely, simultaneously with the cut-out portions 42 arriving at the positions of the pushing pieces 33 due to rotation of the door member 40, the inclined surface 44 at the scooping portions 43 applies impact to the test strip 90 that was held by the pushing pieces 33 and the sorting pieces 34, and causes the test strip 90 to be discharged out to the outer side from the holding member 20 (see FIG. 20A). At this time, the test strip 90 that has been discharged out and fallen down is led to the exterior of the holding member 20 by the inclined surface 44 of the door member 40. In this state, the door member 40 closes the discharge opening 28 while opening the holding member 20.

Figure 20B:
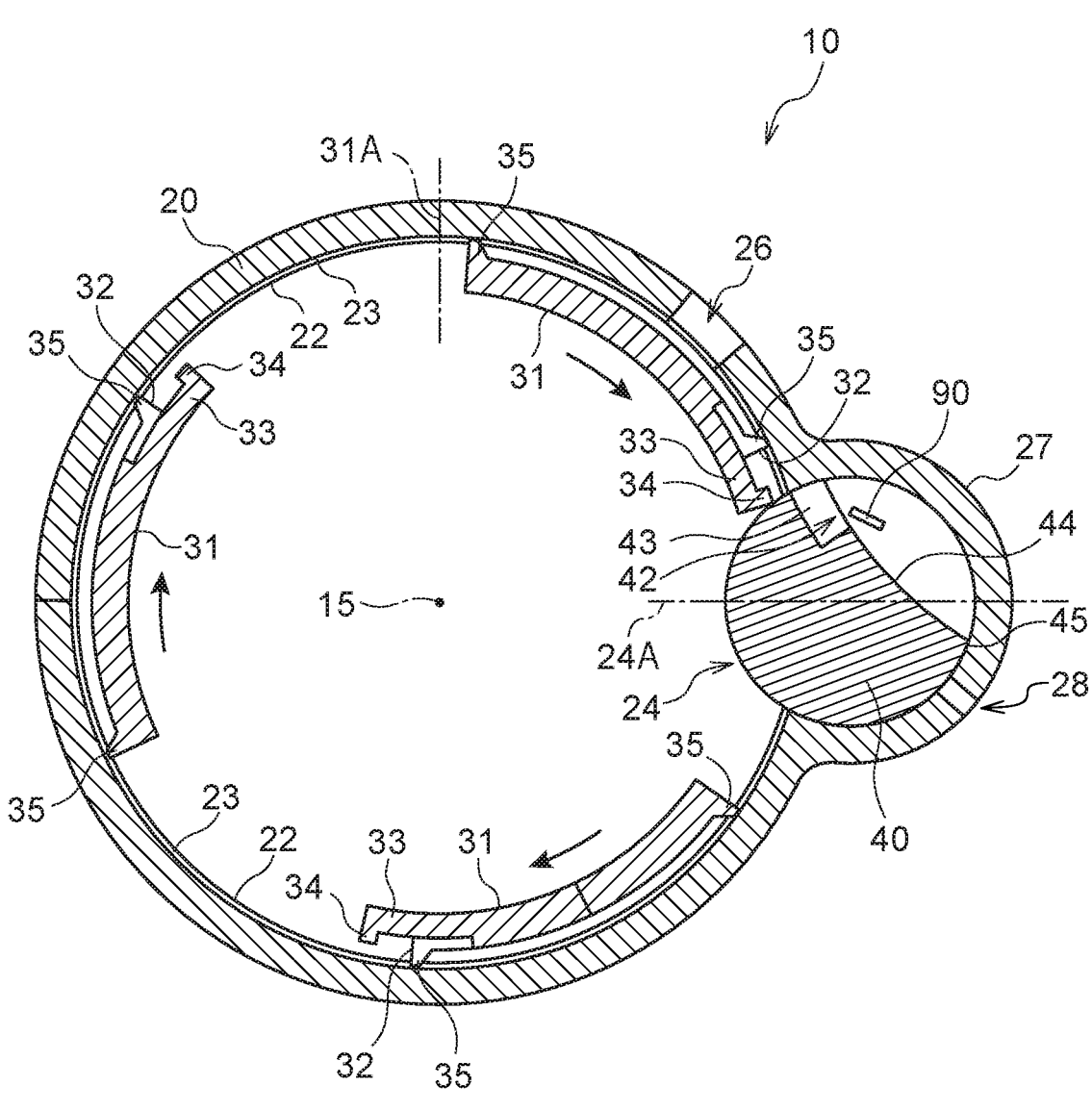
FIG. 20B illustrates a state in which the test strip is discharged, in a cross-sectional view.

When the door member 40 rotates further and reaches the state illustrated in FIG. 20B, the door member 40 again closes the opening portion 24 and the discharge opening 28 by the cutting-off portion 45. Then, the test strip 90 that has been discharged drops down along the inclined surface 44 (FIG. 20B).

Figure 20C:
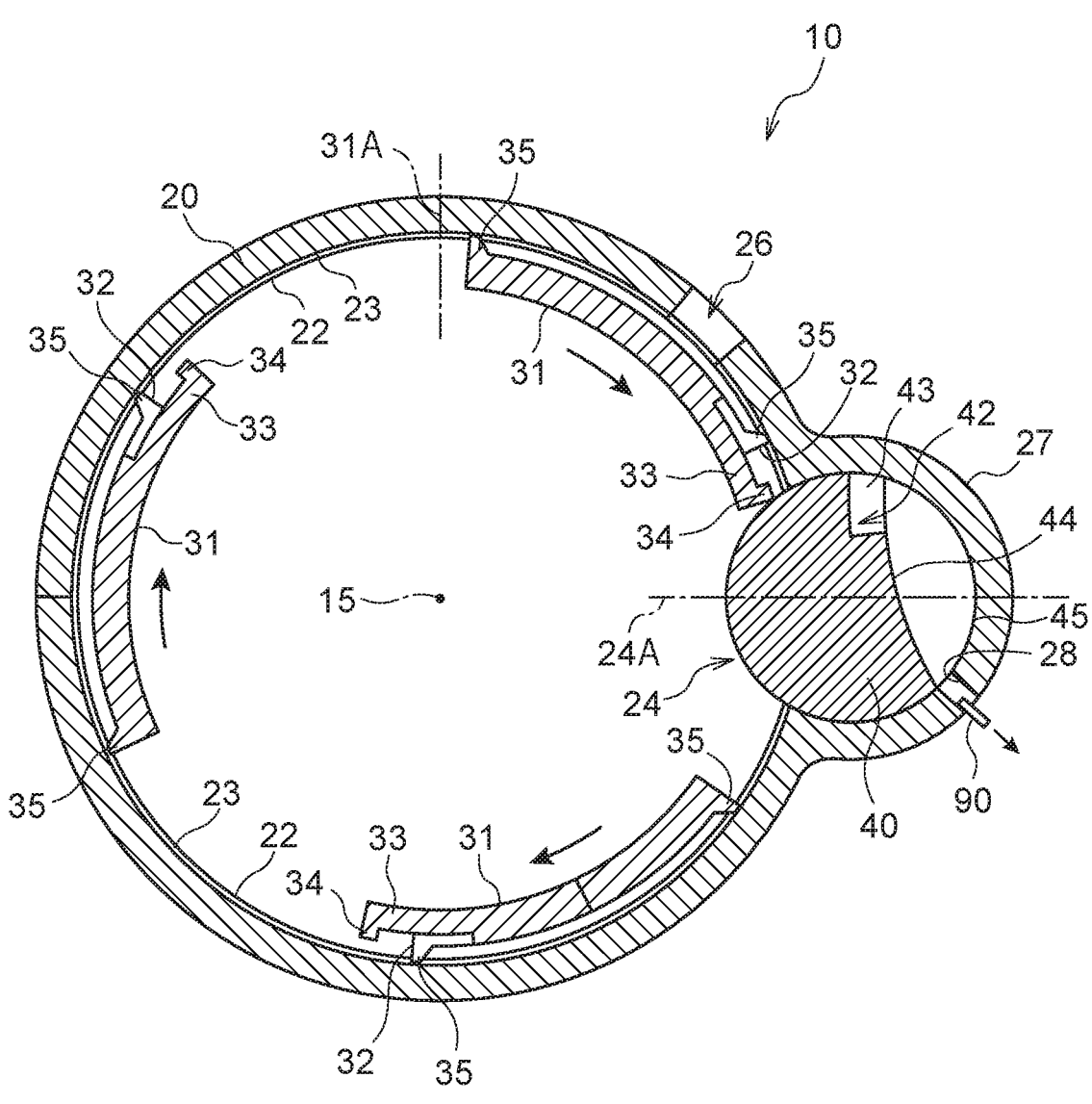
FIG. 20C illustrates a state in which the test strip is discharged, in a cross-sectional view.

When the door member 40 rotates even further and reaches the state illustrated in FIG. 20C, the cutting-off portion 45 opens the discharge opening 28 while closing the opening portion 24 (see FIG. 20C). The test strip 90 that has been discharged is led along the inclined surface 44 to the opened discharge opening 28, and the test strip 90, which has been discharged from the discharge opening 28 to the exterior of the door accommodating portion 27, moves toward the measuring section 5, and is provided to the predetermined measurement thereat.

In the above-described second exemplary embodiment, the door member 40 always closes at least one of the opening portion 24 of the holding member 20 and the discharge opening 28 of the door accommodating portion 27. In other words, because the opening portion 24 and the discharge opening 28 are not open at the same time, the test strips 90 accommodated in the holding member 20 can always be cut-off from outside air. Thereby, changes in the quality of the test strips 90 due to humidity of the outside air or the like can be prevented.

(3) Third Exemplary Embodiment

Figure 21:
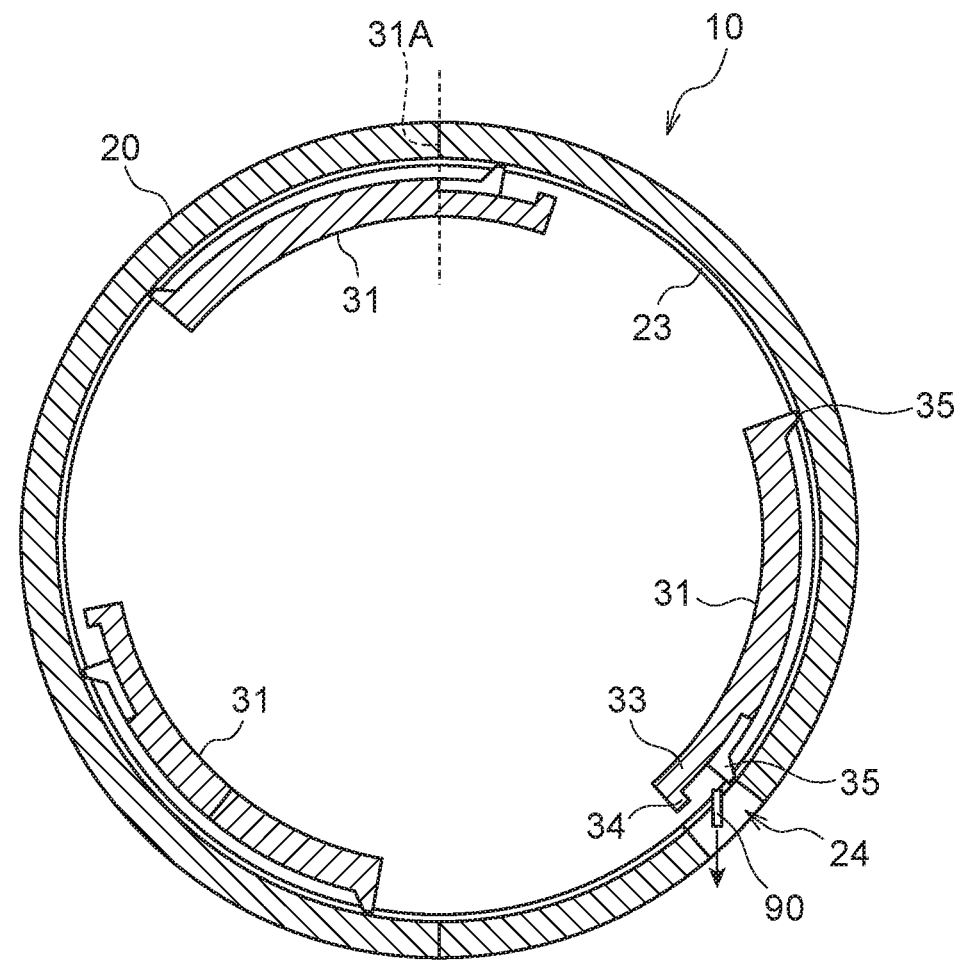
FIG. 21 illustrates a test strip holder of a third exemplary embodiment in a cross-sectional view.

FIG. 21 illustrates the test strip holder 10 of a third exemplary embodiment in a cross-sectional view. In the present exemplary embodiment, the opening portion 24 is at a position of being rotated approximately 135° as seen from the uppermost position 31A, and the door member 40 does not exist. Even with such a form, the test strip 90, which is held by the sorting member 31 that has rotated and has been lowered, can be made to drop down from the opening portion 24.

Figure 22:
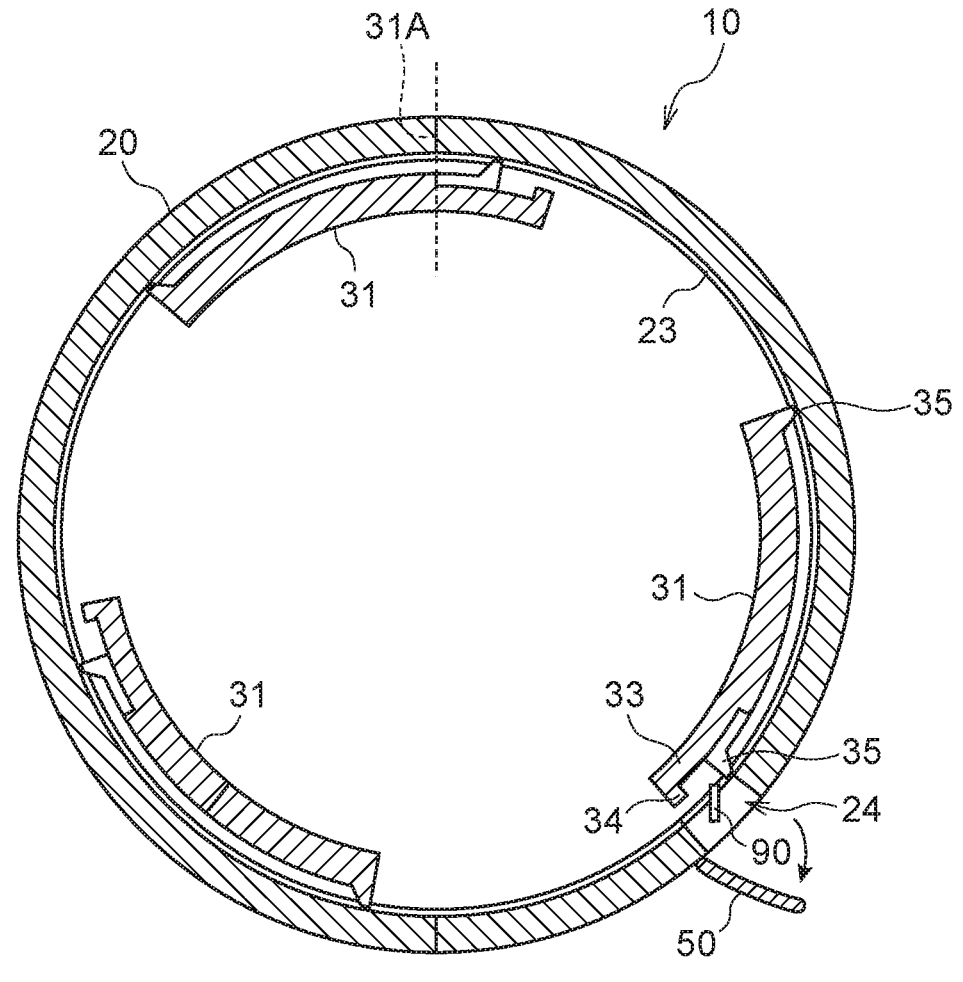
FIG. 22 illustrates a modified example of the third exemplary embodiment in a cross-sectional view.

Note that the opening/closing member 50 that opens and closes the opening portion 24 may be provided, as in the modified example of the present exemplary embodiment that is illustrated in FIG. 22. This opening/closing member 50 can be opened and closed by the opening/closing operation device 4 in the block drawing of FIG. 11.

(4) Fourth Exemplary Embodiment

Figure 23:
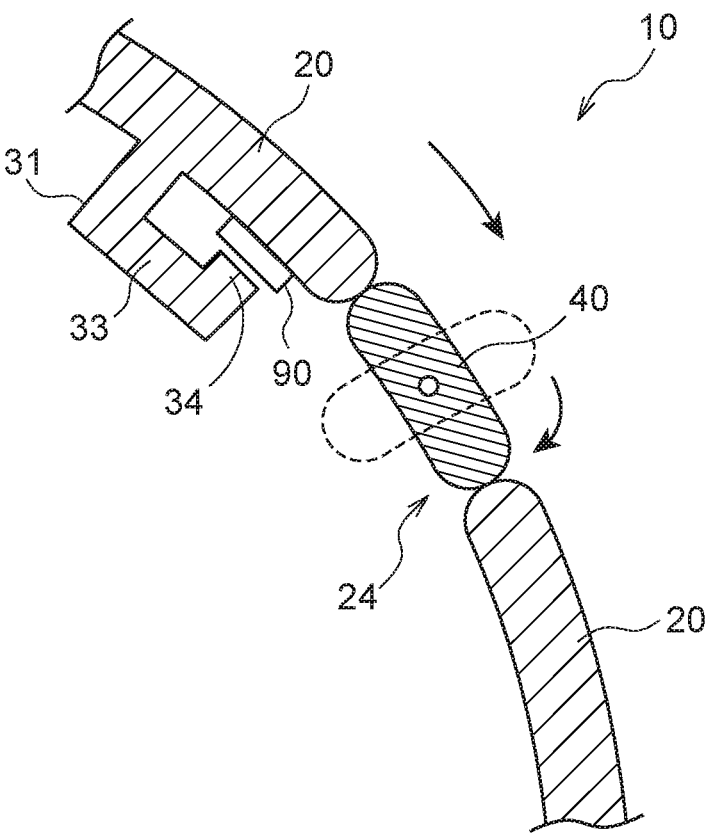
FIG. 23 illustrates a portion of a test strip holder of a fourth exemplary embodiment in a cross-sectional view.

FIG. 23 is a cross-sectional view illustrating a portion of the test strip holder 10 of a fourth exemplary embodiment. In the above-described first to third exemplary embodiments, the holding member 20 does not rotate, and the sorting members 31 rotate with respect to the holding member 20. However, in the present exemplary embodiment, the holding member 20, whose entire inner periphery is a cylindrical surface, itself rotates. Further, the sorting members 31 project out toward the inner side from the inner surface of the holding member 20. In other words, the sorting members 31 are fixed to the holding member 20 and rotate together with the holding member 20.

The opening portion 24 is formed at a distal end side along a rotating direction with respect to the sorting member 31 or at a side facing the pushing piece 33 in the inner surface of the holding member 20, and the door member 40 that can open and close is provided at this opening portion 24. In this exemplary embodiment as well, the holding of the test strip 90 by the sorting member 31 can be carried out in the same way as illustrated in FIG. 14A to FIG. 14E. Further, assuming that the rotational angle of the uppermost position 31A is 0°, after the opening portion 24 rotates to the position of a rotational angle of greater than or equal to 90° and less than or equal to 180°, and more preferably the position of 135°, the test strip 90 can be removed to the outer side of the holding member 20 by opening the door member 40 by the opening/closing operation device 4 illustrated in FIG. 11.

Note that, while the sorting members 31 of the present exemplary embodiment are provided as bodies separate from the holding member 20, the sorting members 31 can be rotated together with the holding member 20 by being fixed to the holding member 20 by an unillustrated fixing portion that is wound in an annular form on the outer periphery of the holding member 20.

(5) Operation and Effects of First to Fourth Exemplary Embodiments

In the above-described first to fourth exemplary embodiments, the single test strip 90 passes through from the gap between the sorting pieces 34 and the cylindrical surface 22, and the test strips 90 that could not pass through fall down when facing downward while the sorting member 31 is rotating. Thereby, merely due to the sorting member 31 rotating within the holding member 20, only one of the test strips 90 is naturally grasped by the sorting pieces 34 and the pushing pieces 33 and can be taken out from the opening portion 24, without excessively applying stress that is due to pushing to the test strips 90 that could not pass through.

(6) Other Points

Note that, although the above exemplary embodiments describe cases of using a urine test strip as the test strip 90, the present invention is not limited to this, and it suffices for the test strip to be a test strip that is elongated and has thickness X.

The test strip holder may be a disposable type in which the insertion opening 25 is not provided at the holding member 20, and plural test strips 90 are accommodated in advance in the test strip holder 10.

What is claimed is:
1. A test strip holder comprising:
a holding member at which at least a portion of a lower side of an inner periphery is a cylindrical surface, wherein the holding member includes a cylinder having an interior for holding a test strip, wherein the test strip is elongated and has thickness X, and wherein a central axis of the cylinder is an imaginary central axis extending a length of the cylinder;
an opening portion provided in an outer surface of the holding member;
a sorting member configured to rotate at the interior of the holding member around a rotation axis that is parallel to and overlaps with the central axis, wherein the sorting member includes sliding projections disposed in a row along an outer peripheral surface of the sorting member, the sliding projections fit into and slide along inner peripheral grooves of the cylindrical surface of the holding member during rotation, such that the test strip moves circumferentially along the cylindrical surface;
a pushing piece projecting out from a distal end edge of the sorting member, wherein the distal end edge is parallel to the central axis, and the pushing piece is parallel to and overlaps with the central axis; and
a sorting piece projecting out from a distal end of the pushing piece toward the cylindrical surface.
2. The test strip holder of claim 1, wherein
a distance B from the distal end edge of the sorting member to the sorting piece, with respect to a length Y of the test strip in a short-length direction, satisfies

$$Y \le B < 2Y, \text{ and}$$

a length C of a portion of the sorting piece, which portion projects out from the pushing piece toward the cylindrical surface, satisfies $$0.5X \leq C < 1.5X.$$

3. The test strip holder of claim 1, wherein:

the central axis of the holding member is the rotation axis, and whose length in a longitudinal direction is greater than or equal to a length of the test strip, the opening portion is provided in a side surface of the holding member along a longitudinal direction, and a length of the opening portion is greater than or equal to the length of the test strip.

4. The test strip holder of claim 1, wherein the pushing piece comprises a plurality of pushing pieces projecting out in parallel from the distal end edge.

5. The test strip holder of claim 1, wherein a plurality sorting members are disposed within the holding member.

6. The test strip holder of claim 1, wherein the sorting member is formed as a body separate from the holding member, and rotates with respect to the holding member.

7. The test strip holder of claim 6, wherein when the cylinder is viewed in cross-section, the opening portion is disposed in the outer surface of the holding member at a first position below a second position of the sorting member at the interior of the holding member.

8. The test strip holder of claim 7, wherein when the cylinder is viewed in cross-section, the second position is at 0° and the first position is between 45° and 90°.

9. The test strip holder of claim 6, wherein a door member configured to open and close is provided at the opening portion.

10. A test strip holder comprising:

a holding member at which at least a portion of a lower side of an inner periphery is a cylindrical surface, wherein the holding member includes a cylinder having an interior for holding a test strip, wherein the test strip is elongated and has thickness X, and wherein a central axis of the cylinder is an imaginary central axis extending a length of the cylinder;

an opening portion provided in an outer surface of the holding member;

a sorting member configured to rotate at the interior of the holding member around a rotation axis that is parallel to and overlaps with the central axis;

a pushing piece projecting out from a distal end edge of the sorting member, wherein the distal end edge is parallel to the central axis, and the pushing piece is parallel to and overlaps with the central axis; and a sorting piece projecting out from a distal end of the pushing piece toward the cylindrical surface, an entirety of the inner periphery of the holding member is the cylindrical surface, the sorting member is fixed to the holding member and is configured to rotate together with the holding member, the sorting member is fixed to the inner periphery of the holding member, and the pushing piece extends inwardly from the inner periphery in a direction towards the central axis, the opening portion is formed at a distal end side in a rotating direction with respect to the sorting member, and a door member configured to open and close is provided at the opening portion.

11. A test strip discharging mechanism comprising:

the test strip holder of claim 1;

a rotation driving device that rotates the sorting member;

an opening/closing member that opens and closes the opening portion; and an opening/closing operation device that opens the opening/closing member when the sorting member approaches the opening portion.

12. A test strip discharging mechanism comprising:

the test strip holder of claim 9;

a rotation driving device that rotates the sorting member; and an opening/closing operation device that opens the door member when the sorting member approaches the opening portion.

13. The test strip discharging mechanism of claim 11, wherein the rotation driving device stops rotation of the sorting member when the sorting member approaches the opening portion, and restarts rotation of the sorting member when the opening/closing operation device closes the opening portion.

14. The test strip discharging mechanism of claim 11, comprising a proximity sensor that senses that the sorting member has approached the opening portion, wherein the opening/closing operation device operates due to the proximity sensor sensing the approach of the sorting member.

15. The test strip discharging mechanism of claim 14, wherein the rotation driving device stops rotation of the sorting member when the proximity sensor senses the approach of the sorting member, and restarts rotation of the sorting member when the opening/closing operation device closes the opening portion.

16. The test strip holder of claim 1, wherein a distance between the cylindrical surface and a surface of the sorting piece that is nearest to the cylindrical surface is greater than or equal to the thickness X of the test strip and less than two times the thickness X of the test strip.

17. The test strip holder of claim 10, wherein a distance between the cylindrical surface and a surface of the sorting piece that is nearest to the cylindrical surface is greater than or equal to the thickness X of the test strip and less than two times the thickness X of the test strip.

18. The test strip holder of claim 5, wherein the plurality of sorting members are disposed along an inner periphery of the cylindrical surface with a gap provided between each sorting member.

19. The test strip holder of claim 10, wherein the pushing piece is located at a fixed radial distance from the central axis.

* * * * *